Figure 1:
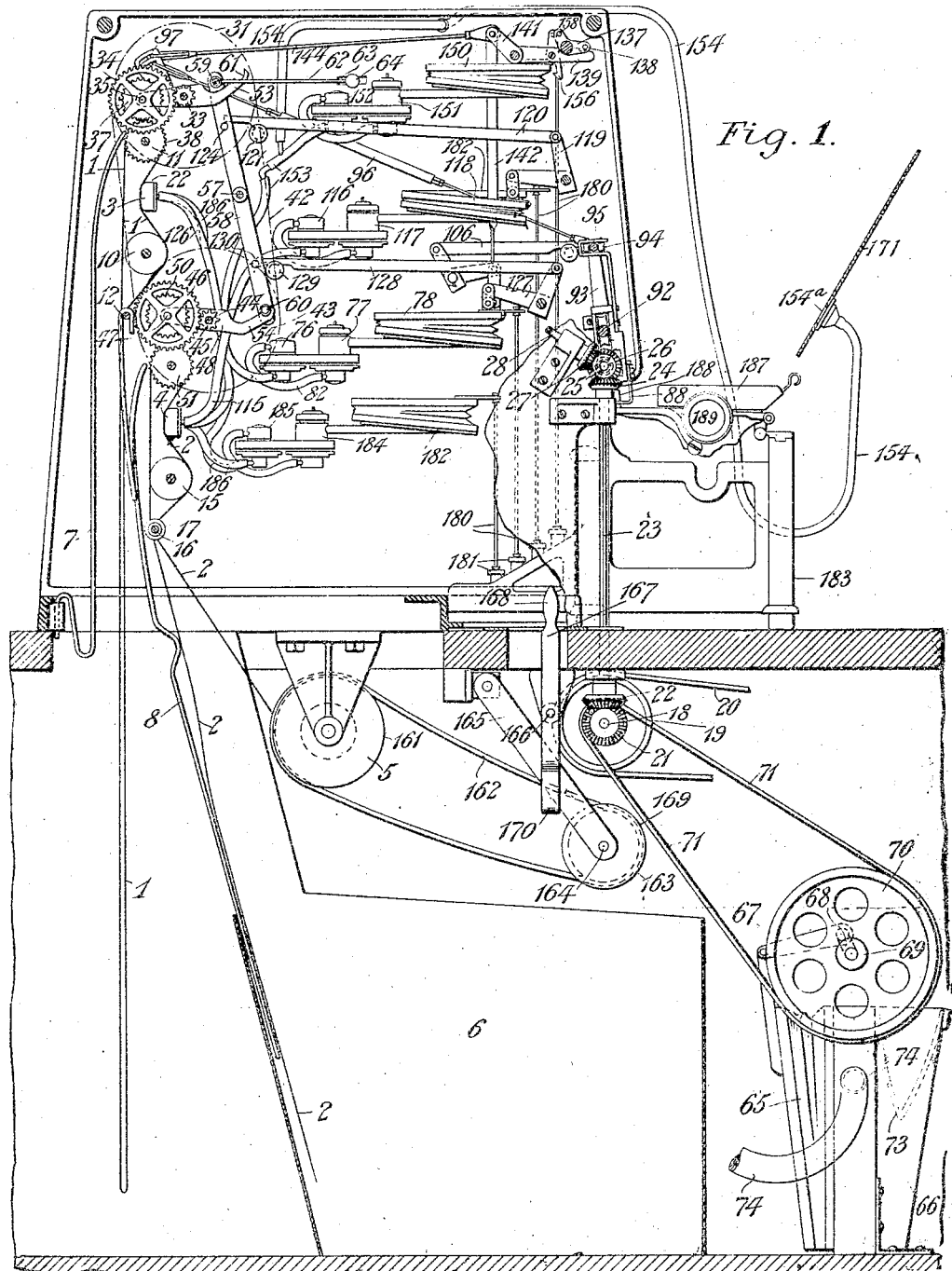

L. R. ROBERTS.
AUTOMATIC TYPE WRITER ACTUATOR.
APPLICATION FILED DEC. 13, 1910.

1,147,442.

Patented July 20, 1915.
6 SHEETS—SHEET 1.

Witnesses:
John A. Rennie
C B Pitblado

Inventor:
Lyman R. Roberts
By his Attorney
C E Stickney

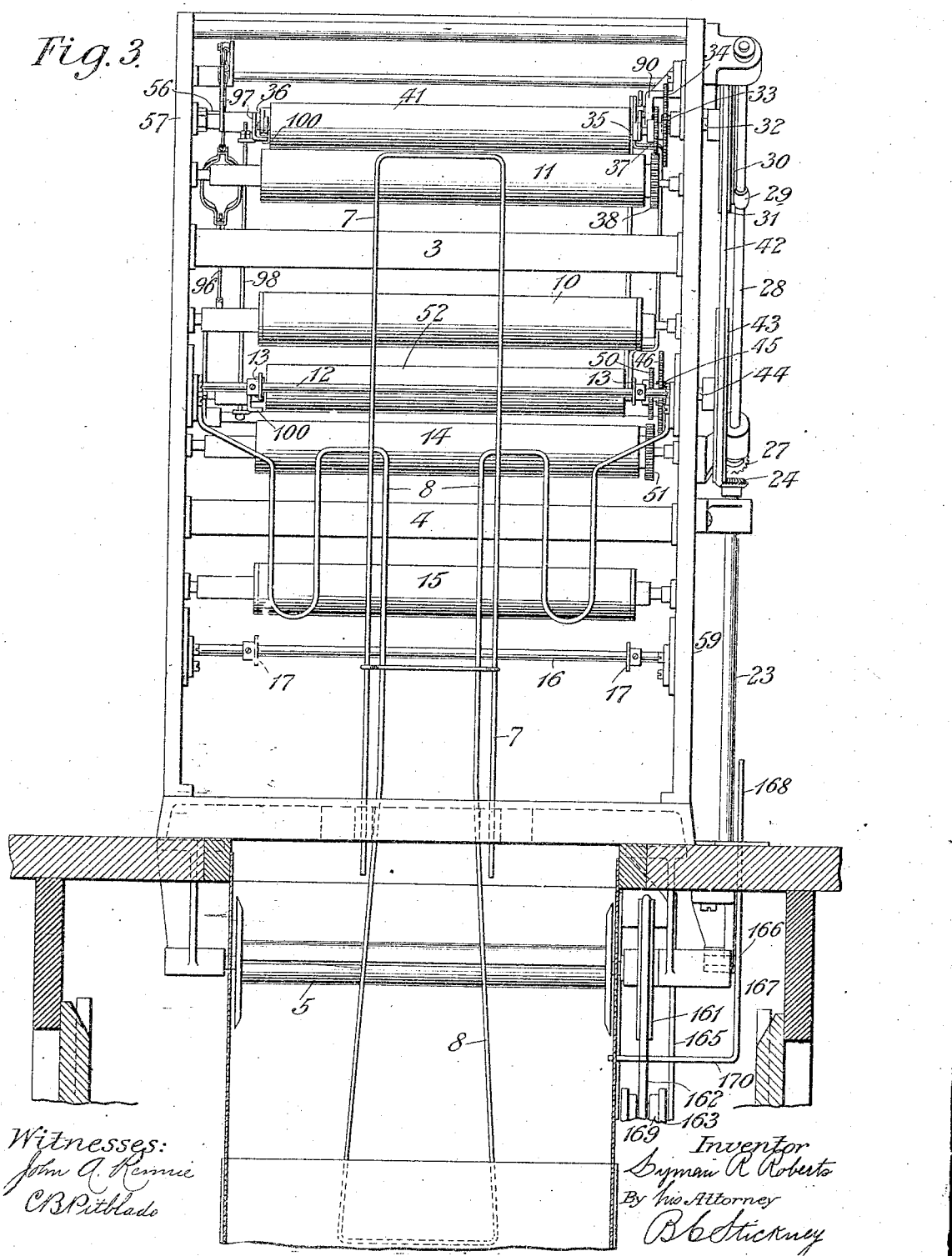

L. R. ROBERTS.
AUTOMATIC TYPE WRITER ACTUATOR.
APPLICATION FILED DEC. 13, 1910.
1,147,442.
Patented July 20, 1915.
6 SHEETS—SHEET 4.
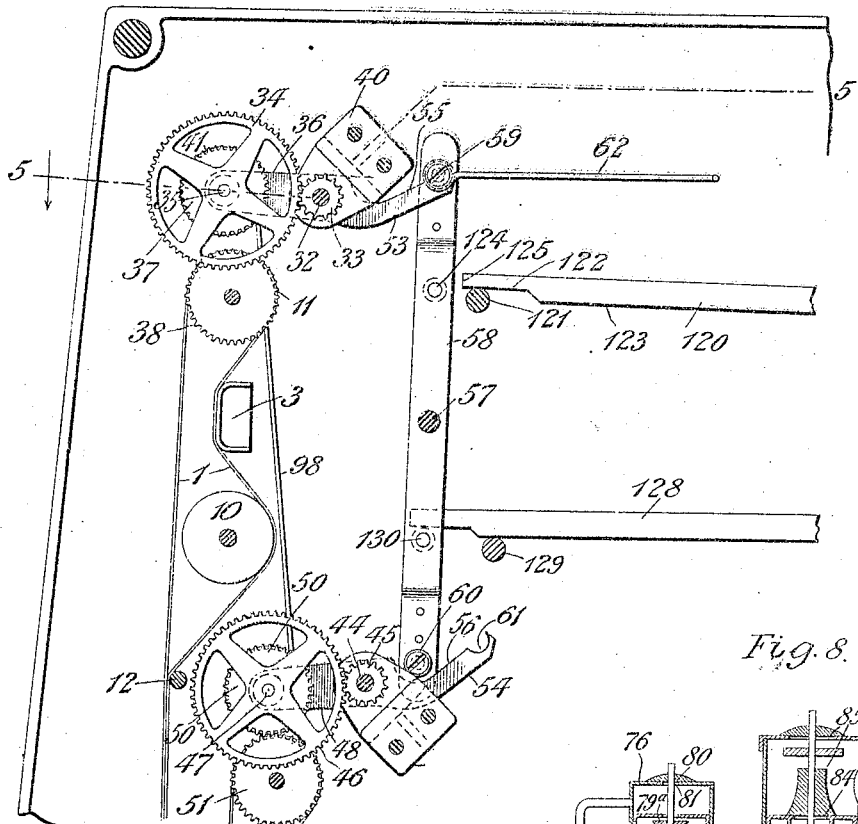
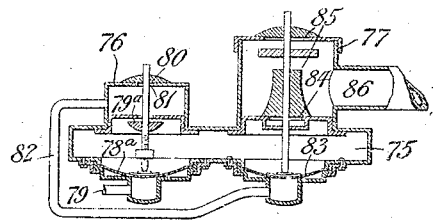
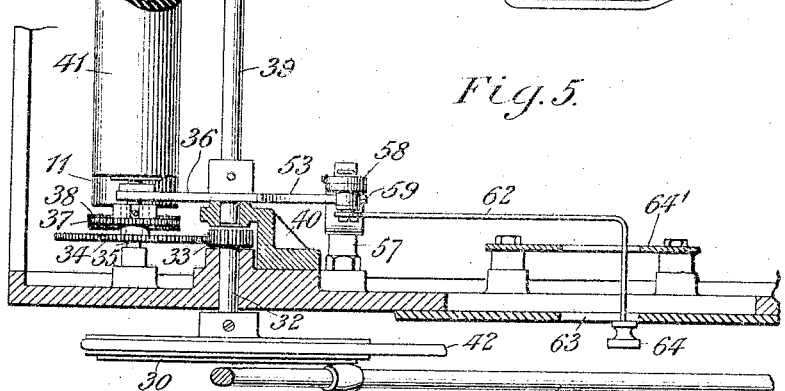

L. R. ROBERTS.
AUTOMATIC TYPE WRITER ACTUATOR.
APPLICATION FILED DEC. 13, 1910.
1,147,442.
Patented July 20, 1915.
6 SHEETS—SHEET 5.
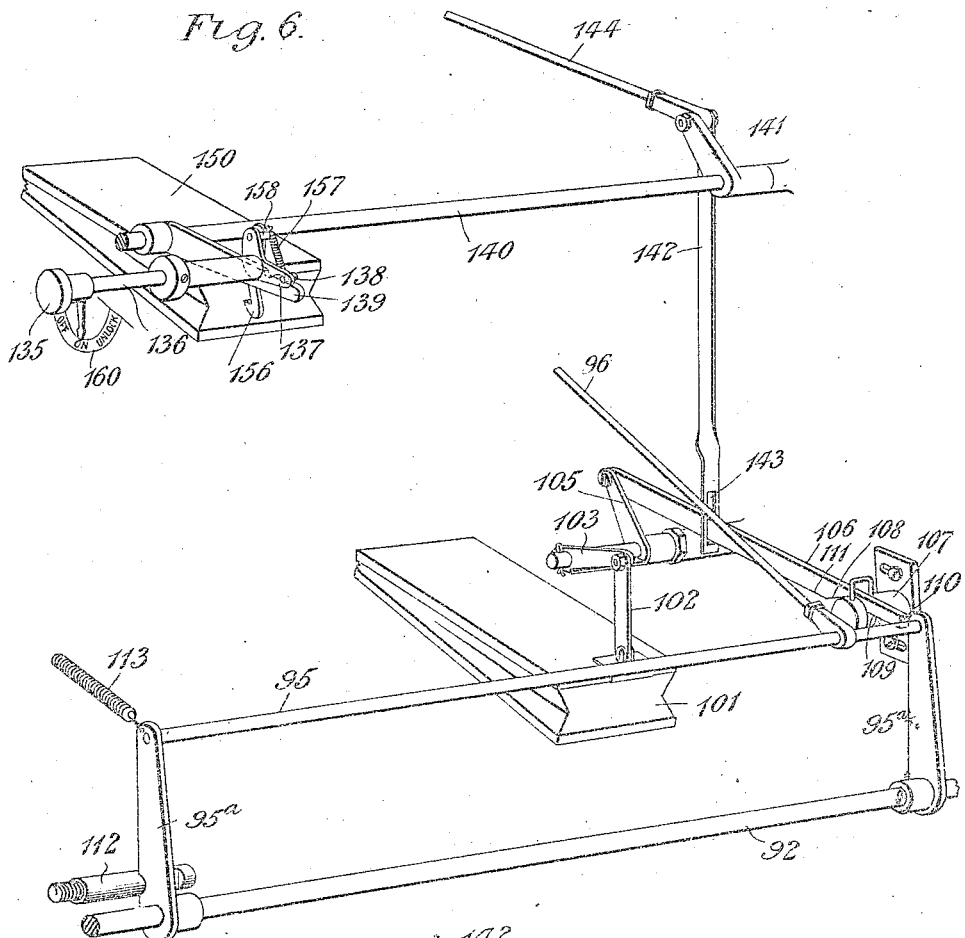
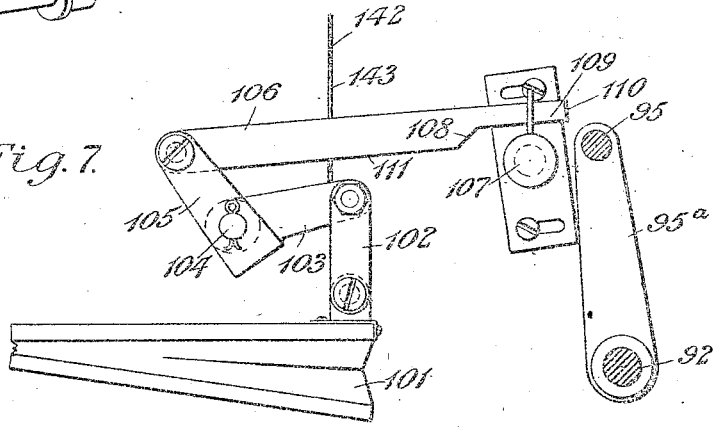

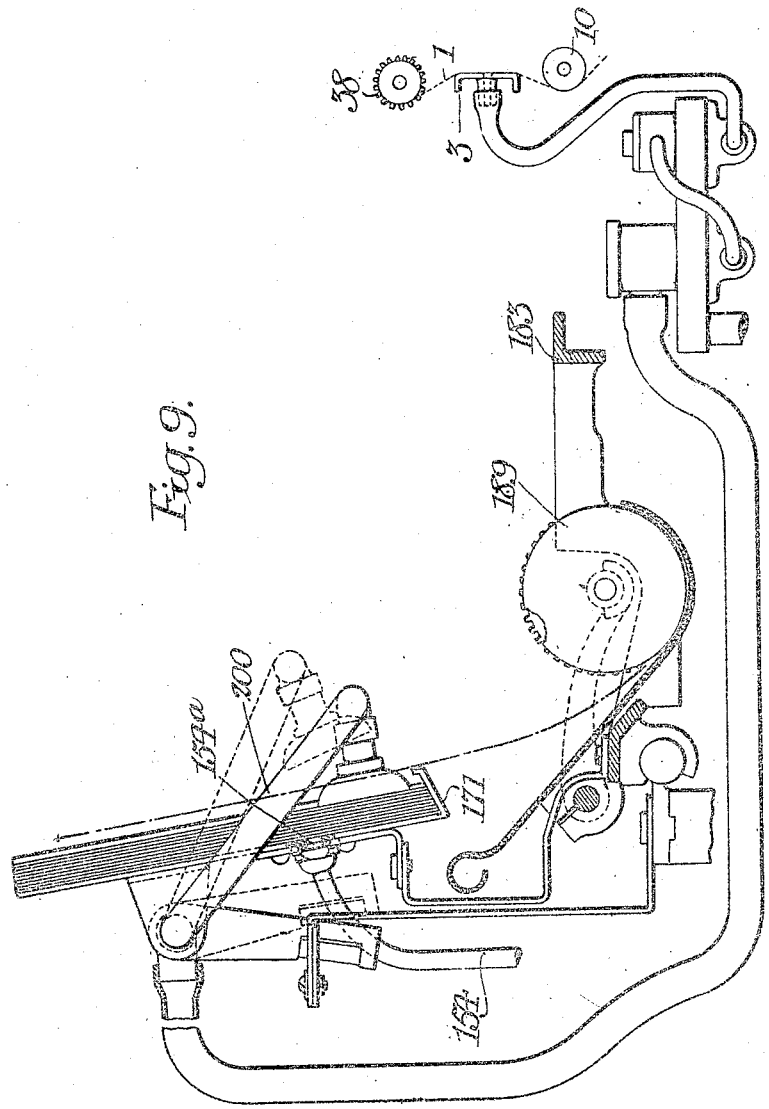

UNITED STATES PATENT OFFICE.

LYMAN R. ROBERTS, OF RUTHERFORD, NEW JERSEY, ASSIGNOR TO UNDERWOOD TYPEWRITER COMPANY, OF NEW YORK, N. Y., A CORPORATION OF DELAWARE.

AUTOMATIC TYPE-WRITER ACTUATOR.

1,147,442.

Specification of Letters Patent.

Patented July 20, 1915.

Application filed December 13, 1910. Serial No. 597,113.

*To all whom it may concern:*

Be it known that I, LYMAN R. ROBERTS, a citizen of the United States, residing in Rutherford, in the county of Bergen and State of New Jersey, have invented certain new and useful Improvements in Automatic Type-Writer Actuators, of which the following is a specification.

The present invention relates to an automatic operator for typewriting machines.

The invention in many of its features has particular reference to an operator such as disclosed in Patent No. 1,109,597, dated September 1, 1914, granted jointly to Lyman R. Roberts and Charles L. Davis.

The operator of the aforesaid patent comprises a system of devices for operating the keys of a typewriter, and also comprises mechanism for effecting the carriage return and line spacing operations of the typewriter, and for effecting certain other operations. The various parts of the operator are in general controlled in their action by suitable master controlling devices, progressively fed or driven within the machine. In the aforesaid patent, the master controlling means is shown as a perforated sheet fed over a tracker board from which there are pneumatic connections to the various operating parts. There are shown two such master sheets and tracker boards, and means for causing the sheets to operate one at a time, alternately or intermittently, so that the machine may be under the control of one or the other master sheet, as the occasion requires. Means are provided for shifting the control from one sheet to the other, and the shifting is preferably effected automatically by means of the sheets themselves so that when one sheet has done its work it may present a suitable perforation to its tracker board whereby its own action is caused to be discontinued, and the other sheet caused to become active. The purpose of the two sheets is to utilize one sheet as a master sheet which represents a subject matter common to all the writings to be produced; the writing of the body of a circular letter being illustrative of the function of such a master sheet. The other sheet is used to control the writing of certain matter special to each letter, such for instance as the addresses of the letters represented by the other sheet. In normal operation therefore, the address control sheet is the one first active, and thereafter the sheet which represents the body of the letter becomes active. Thereupon the address sheet becomes active again, etc. The address sheet will ordinarily cause different matter to be written on each operation of the same, whereas the other sheet will cause the same matter to be written over and over again. It will be understood however that so far as many features of the present invention are concerned, a single master sheet may be employed; and that where two or more sheets are employed, the character of the writings to be produced by each may be whatever may be desirable. It will also be understood that so far as many features of the present invention are concerned, the control or master devices may be other than perforated sheets, and that the control may be other than pneumatic.

The machine is preferably driven from a continuous source of power which is alternately connected to and disconnected from the feed rolls of the two sheets. Where the control is pneumatic, as in the embodiment of the invention hereinafter to be described, the power pneumatics are operated by means of bellows (shown as exhaust bellows), also connected to the source of power, and operating when placed in communication with the power pneumatics to collapse the same, and so operate the connections from the power pneumatics to the mechanisms. In the said patent the feed rolls of the master sheets are shown as permanently geared to the driving connections from the source of power, but the rolls are intended to revolve without feeding the sheets except when the sheet is pressed against the feed roll by an idler or pressure roll, which latter is movable to and from the feed roll to render active or to silence the control sheet, as the case may be. In the present invention, provision is made to have the driving connections in gear with the feed rolls only when the master sheet is to be active. The feed roll can only move when the driving gear is moved into engagement with it, and at such times the sheet and feed roll must move together. There is no attempt in the present invention to move a feed roll while maintaining the sheet silent thereon, as in the patented construction. False feed of a sheet when it should be silent is impossible in the present invention. The invention therefore involves a novel, continuously operating driving gear, and means for shifting the same into and out of engagement with the feed rolls.

In the machine of the present invention, the paper for use in the typewriter is preferably held in a magazine from which it may automatically be fed to the typewriting machine by means such as shown in Patent No. 1,132,034, granted March 16, 1915, jointly to me and Charles L. Davis. When the paper in the magazine is exhausted, the attendant has heretofore stopped the machine to replenish the supply.

It is an object of the present invention to provide means for automatically stopping the machine upon exhaust of the paper in the magazine, thus rendering unnecessary the presence of an attendant for this purpose. The stoppage of the machine in the embodiment of the invention hereinafter shown is effected from the magazine; and comprises means, the operation of which is controlled by the paper, so that when all or substantially all of the paper is exhausted, the stopping device is permitted to operate. This stopping means is shown as a pneumatic controlled by an air connection opening into the magazine, which opening is closed by the paper until the same is all removed, whereupon air enters the pneumatic connection to operate the pneumatic. Other paper controlled means may within the scope of the invention be substituted for the pneumatic; the control may be mechanical or electrical, and may be effected in various ways.

It is also an object of the invention to provide means whereby the machine may be automatically stopped at the last address on the address control device or perforated sheet. The stopping device which is connected to the magazine to stop the machine at the last sheet of paper is also conveniently used to stop the machine at the last address; and for this purpose has an operative connection to the address control device as well as to the magazine. When the stopping device is a pneumatic, and the control device is a perforated sheet registering with a tracker board, the connection to the stopping device from the address control device may conveniently be an air tube from a duct in the tracker board of the address sheet.

It sometimes happens that after the last sheet of paper in the magazine is moved, and in moving effects the operation of the stopping device, there is nevertheless some matter to be written on that sheet. If such is the case, then the actual stopping of the machine should be delayed, or if it has occurred, then the operation of the machine should be resumed long enough to complete the last page. This situation commonly arises if the stopping device is controlled from the magazine, because after the last sheet has left the magazine, it has yet to be fed around the platen before the machine is through with it. Of course, the magazine may be refilled after the machine has stopped and before the last sheet of the previous supply is written, but such replenishment may not be convenient or desirable.

The present invention provides means for rendering ineffective the stopping device so that the writing of the last page may be completed with the magazine empty. This means, in the form of the invention hereinafter shown, comprises a device for breaking the operating connection from the stopping device to a power cut-off device. The breaking of such connection renders the stopping device ineffective, either to cut off the power in the first instance, or to maintain a cut-off of the power, if the stopping device has already operated to effect the same.

It has been found desirable to render the carriage-return and line-spacing mechanism inoperative when for any reason the power is shut down, so that upon the resumption of operation of the machine, supernumerary line-spacing operation may not be effected. The manner in which unnecessary line-spacing may occur may be exemplified in a pneumatically controlled operator such as shown in Patent No. 1,109,597 above referred to. The carriage-return and line-spacing mechanism is therein shown as controlled by a pneumatic which is caused to collapse and bring the line-space mechanism into operation whenever the pneumatic is connected with the exhaust bellows, upon presentation of a suitable perforation at the tracker board. The control sheet is simultaneously silenced, so that the perforation which caused the operation of the pneumatic continues to register with the tracker board duct. If at such times the operation of the machine is discontinued the exhaust is destroyed, and the pneumatic expands, returning the connections by means of which it has just effected the operation of the line-spacing mechanism. If now the operation of the machine is resumed, the exhaust is again created, and, as the perforation in the control sheet still registers with controlling connections to the pneumatic, the latter again collapses, and the line-space mechanism is again operated, although no line-spacing may be wanted at this time.

The present invention provides means for rendering the carriage-return and line-spacing mechanism inoperative when the operation of the machine is to be discontinued, and for holding such mechanism inoperative until operation of the machine has been resumed, thereby eliminating the possibility of excessive line-spacing. In the form of the invention hereinafter shown, this feature of invention comprises a device for breaking or rendering ineffective the connections by means of which the line-spacing mechanism is normally operated.

The invention also provides a means for disconnecting the drive of whichever control device or perforated sheet may be in operation at the time the line-spacing mechanism is operated, or of whichever may be in operation at the time the machine is stopped upon exhaust of paper in the magazine, or stopped for some other reason; while at the same time maintaining the drive of the other control device ineffective, so that at such times neither control device can operate.

The invention also provides a means for rewinding a master sheet while the same is within the machine, and for effecting the rewind from the power connections of the machine.

Other objects and advantages of the invention will hereinafter appear.

Figure 2:
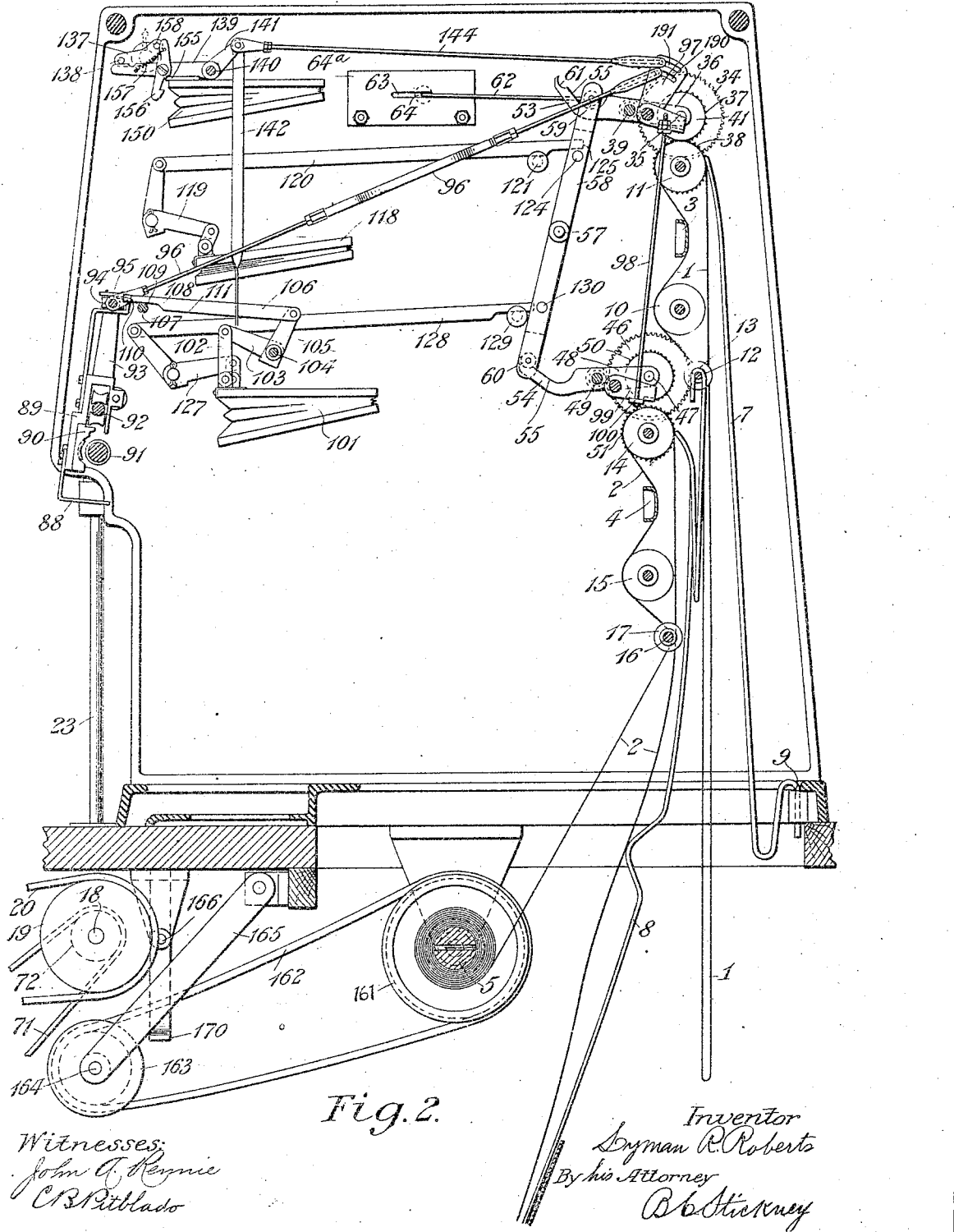

In the accompanying drawings, Figure 1 is a view in elevation, in cross section through the frame of the machine, of the assembled apparatus, showing the same in operative relation to a typewriter. Fig. 2 is a view similar to Fig. 1 on an enlarged scale and looking in the opposite direction, certain of the mechanisms being omitted. Fig. 3 is a view in end elevation of the assembled apparatus looking from the left in Fig. 1. Fig. 4 is a view in side elevation of certain features of the invention relating particularly to the control sheets, the means for driving the same, and the shifting means for connecting the drive of one control sheet and disconnecting that of the other. Fig. 5 is a sectional top plan view of the mechanism shown in Fig. 4 on the line 5—5 of Fig. 4, a few parts being omitted or added. Fig. 6 is a perspective view of the mechanism for operating and for rendering inoperative the carriage return and line-spacing mechanism, and of the devices for stopping and for unlocking the machine. Fig. 7 is a view in side elevation of certain of the details of the mechanism shown in Fig. 6. Fig. 8 is a detail view in cross section through a primary and secondary pneumatic, showing also the pneumatic connections of the same. Fig. 9 is a detail view partially in section showing the feeder for supplying the sheets of paper from the magazine to the typewriter.

The machine shown in the drawings is controlled in its operation by two perforated master sheets 1 and 2 respectively. The control sheet 1 is perforated to represent the body of the letter, circular or other document to be written; it is shown as an endless sheet, and coöperates with a tracker board 3. The control sheet 2 is perforated to represent the names and addresses of the various persons to whom the writings are to be addressed, or carry any other special matter to be added to the common subject matter of all the letters which is carried by sheet 1. Sheet 2 coöperates with a tracker board 4, situated below the tracker board 3. Sheet 2 is not shown as a continuous sheet, but is wound upon a roll 5 from which it is paid off to the tracker board 4 and thence into a chamber 6 in the base of the machine. In the aforementioned Patent No. 1,109,597, both control sheets are shown as endless. The delivery roll 5 for the address sheet is one of the features of the present invention, but an endless address sheet may nevertheless be employed in a machine embodying certain of the other features of the invention presently to be described. Partition members 7 and 8 mounted in the frame 9 of the machine serve to prevent entanglement of the control sheet 1 with other parts of the apparatus, and member 8 serves to separate the control or master sheet 1 from the address control sheet 2.

The master sheet 1 is led over the tracker board 3 between an idler or guide roll 10, and the feed roll 11 which is rotated to feed the sheet. Below the idler 10 is a rod 12 over which the sheet 1 also passes. The rod 12 is provided with retaining flanges 13 adjustable longitudinally thereof. The flanges 13 keep the sheet in correct alinement with the tracker board, and are adjustable to the width of the sheet, as well as to compensate for any expansion of the sheet due to moisture, etc. It is unnecessary to have retaining flanges on the feed roll 11 or idler 10; the guiding, so far as the proper alinement of the sheet is concerned, is done by the flanges 13, and this flanged rod 12 being at a distance from the tracker board controls the alinement of the sheet much more readily than could be done by means of flanges on the feed roll, and saves the wear on the paper which is incurred by the use of flanges on the feed roll. The address control or master sheet 2 is led over its tracker board 4 between its feed roll 14 and an idler 15 similar respectively to the feed roll 11 and idler 10 for sheet 1. Below the idler 15 is a rod 16 having adjustable flanges 17, and serving to control the alinement of sheet 2 in the same manner that flanged rod 12 controls sheet 1.

It will be understood that the master sheets 1 and 2 are not in operation or being driven at the same time. The master sheet 2 controls the operation of the typewriter to address the letter, during which time the sheet 1 for writing the body of the letter is silent. The address sheet having performed its function is then silenced while the sheet 1 operates to write the letter, after which sheet 1 is again silenced and sheet 2 again brought into operation, according to principles in the co-pending application above referred to.

The power for feeding the master sheets, as well as the power for operating the pneumatics and other mechanisms is shown in the drawings as derived from a power shaft 18 carrying a pulley 19 by means of which it is driven from any suitable source of power by a belt 20. Any suitable driving connections to the shaft 18 may be substituted for the belt 20. The shaft 18 rotates continuously while the machine is in operation. It drives the feed rolls 11 and 14 through the following connections: Fast to the shaft 18 is a bevel gear 21 meshing with a bevel gear 22 fast to a vertical shaft 23. Fast to the upper end of shaft 23 is a bevel gear 24 meshing with a bevel gear 25 on a horizontal shaft 26. Also meshing with gear 25 is a bevel gear 27 on an inclined shaft 28 (shown only in part in Fig. 1). Near its upper end shaft 28 carries a friction roll 29 which engages the face 30 of a friction wheel 31. The face 30 is of any suitable friction material such as leather; and the roll 29 is adjustable along the shaft 28 to vary its distance from the axis of the wheel 31 so that the speed of the wheel 31 may be adjusted to the speed desired for driving the master sheets 1 and 2. Wheel 31 is mounted on a stud shaft 32 fast to which is a pinion 33 in mesh with a gear 34 on a shaft 35 which latter has bearing at each side of the machine in bracket arms 36. Fast to the shaft 35 is also a pinion 37 which in one position of the arms 36 meshes with a pinion 38 on the feed roll 11 of the control sheet 1. The arms 36 are fast to a rock shaft 39 which is carried by brackets 40 and which is in alinement with the shaft 32; and the arms 36 may be rocked to lower and lift the shaft 35 so as to move the pinion 37 into and out of engagement with the pinion 38 on the feed roll, thus making and breaking the driving train of the latter at will. In the position of the arms 36 shown in Fig. 1, the pinion 37 is in mesh with the pinion 38, and the feed roll is being driven from the pinion 37 to feed the control sheet 1. In Fig. 4, the arms 36 are shown in position such that pinions 37 and 38 are out of mesh, and at this time the control sheet 1 must be silent. Since the arms 36 swing on an axis which coincides with the axis of the shaft 32, the pinion 33 is in mesh with gear 34 whatever the position of the arms 36. On the shaft 35 with the pinion 37 is a roll 41 which, when the pinions 37 and 38 are in mesh, holds the control sheet 1 against the feed roll 11 to insure the proper feed of the sheet; and which also maintains the proper relation of pinions 37 and 38.

The friction wheel 31 through which the feed roll 11 is driven from the inclined shaft 28 is also a pulley which by means of a belt 42 drives a pulley 43 on a stud shaft 44 similar to the shaft 32 but located and intended for driving through intermediate gearing the feed roll 14 of the address control sheet 2. Shaft 44 carries a pinion 45 meshing with a gear 46 on a shaft 47. Shaft 47 is carried on arms 48 attached like arms 36 to a rock shaft 49 supported in alinement with the shaft 44. Fast to shaft 47 is a pinion 50 adapted to be moved into and out of mesh with a pinion 51 on the feed roll 14 of the address control sheet. Shaft 47 also carries a roll 52 adapted to bear upon the address control sheet when pinions 50 and 51 are in mesh, for the same purpose as roll 41. In Fig. 1, the arms 48 are shown as supporting the pinion 50 out of engagement with pinion 51 so that the address control sheet cannot be driven, whereas in Fig. 4, the arms 48 have been moved to connect up the drive for the address control sheet. It will be noted from an inspection of Figs. 1 and 4 that when the control sheet 1 is being driven, the control sheet 2 is idle, and vice versa.

From the foregoing it will be seen that when the machine is in operation there is a continuous drive of the parts from the power shaft 18 to the pinions 37 and 50, which are the pinions adapted to be moved into and out of engagement with the feed roll pinions 38 and 51 respectively. The feed rolls 11 and 14, are however only driven when their pinions 38 and 51 respectively mesh with pinions 37 and 50. Heretofore the feed rolls have been driven continuously, and the drive of the control sheet has been governed by the pressure of an idler against the feed roll. The removal of the idler has been relied upon to cause a discontinuance of the feed of the control sheet. It has occurred however, particularly with heavy control sheets, that there has been sufficient friction between the feed roll and the control sheet, even with the idler removed, to cause movement of the sheet at a time when it should be silent. In the structure above described, however, there can be no drive of the control sheet when once the driving gear is disconnected from the feed roll. The pinions 37, 38, 50 and 51 have fine sharp teeth so that there may be a prompt and certain pick-up of the feed rolls by the driving pinions.

Since as heretofore pointed out, the two control sheets are not in operation at the same time, and one is always set to be operated when the other is unset, there is employed a device whereby the disconnection of the feed roll of the control sheet 1 from the driving train is accompanied by the connection to the driving train of the feed roll of the control sheet 2, and vice versa. One of the arms 36, which supports the shaft 35 of the driving pinion 37, is integral with a lever arm 53, serving as a means to rock the arms 36 and parts supported thereon. Similarly one of the arms 48, on the same side of the machine as the lever 53, is integral with a lever arm 54, by means of which the arms 48 and supported parts may be rocked. The upper surfaces of the levers 53 and 54 are shaped to form cam surfaces 55 and 56 respectively by means of which the levers are moved. For engaging the cams 55 and 56 to rock the levers 53 and 54, there is pivoted at 57 to the frame of the machine a two armed lever 58, the upper arm of which carries a roller or pin 59 to coöperate with the cam 55, and the lower arm of which carries a similar roller or pin 60 to coöperate with the cam 56. When the lever 58 is in the position shown in Fig. 1, the pin 60 is on the highest part of the cam surface 56 of lever 54 and is holding the driving pinion 50 out of engagement with the feed roll of the address control sheet 2; and, at the same time, the inner arm of lever 58 is holding the pin 59 opposite the lowest part of cam surface 55, thus permitting the driving pinion 37 of the control sheet 1 to engage the feed roll of that sheet. Sheet 1 is therefore active, and address sheet 2 silent. In Fig. 4, the condition is reversed because of the different position of the lever 58. In order that lever 58 when operated may hold the parts in the desired position, each of the cam levers 53 and 54 is provided at the upper end of its respective cam surface with a seat 61 for the pin 59 or 60. When either pin 59 or 60 is in its seat the parts are held against unintentional displacement.

In the normal operation of the machine, the shift of the lever 58 from Fig. 1 to Fig. 4 position and vice versa is automatic and is effected from one or the other of the tracker boards 3 and 4. When the address control sheet has caused an address or other matter to be written, it presents to its tracker board 4 a perforation through which air passes to a pneumatic which acts to throw the lever 58 to Fig. 1 position, thereby rendering active the control sheet 1 for the body of the letter to follow, and rendering silent the address control sheet 2. After the control sheet 1 has caused to be written the body of the letter for the given address it presents to its tracker board 3 a perforation which admits air to a pneumatic which acts to shift the lever 58 again to Fig. 4 position so as to render the control sheet 1 inactive, and the address control sheet 2 active for the next address. The lever 58 may, however, be shifted manually to permit the start to be made with either control sheet, by means of a rod 62 attached to the pin 59 on the lever 58 and having an offset which protrudes through a slot 63 in the side of the machine and terminates in a finger piece 64. By shifting the finger piece one way or the other, the machine is set for the desired control sheet. A slotted plate 64ª supported at a slight distance from the side of the frame assists in supporting and guiding the offset of the rod 62 to prevent binding, etc.

With the exception of certain pneumatics for performing novel functions, the pneumatics of the present machine may be of the same general character and made to operate in the same manner as the pneumatics in the machine of the Patent, 1,109,597 hereinbefore referred to. The present invention involves no change in the pneumatic operation of the hammers 180 for actuating the type keys 181 of the typewriter 183. These hammers are operated from power pneumatics 182 controlled by secondaries 184 and primaries 185 arranged in tiers, and controlled by connections 186 to both tracker boards, as fully described in the aforesaid Patent, 1,109,597.

All the pneumatics are operated directly or indirectly by means of exhaust bellows 65 or 66 of which there are preferably a series, (see Fig. 1) and of which one part, 65, is expanded and contracted by a pitman 67 connected to a crank 68 on a shaft 69, which latter carries a pulley 70 continuously driven from the power shaft 18 by means of a belt 71 engaging a pulley 72 on the power shaft. The part 66 of the bellows is normally held expanded by a spring 73, and in contracting exhausts air through a pipe 74 which is in open continuous connection with the chambers 75 (see Fig. 8) of the various pneumatics, and maintains a condition of exhaust in the chambers 75, thus enabling the external air, when admitted to certain valves of the pneumatics, to operate the same.

In Fig. 1, there is shown a primary pneumatic 76, a secondary pneumatic 77 and bellows 78 for operating each of the several pneumatically controlled devices. The tracker board connection 79 in Fig. 8, leads in each instance to the primary pneumatic, so that when the connection 79 is opened by a perforation in the sheet at the tracker board, air enters the pneumatic 76, lifts a diaphragm 78ª, closes a valve 79ª, opens a valve 80 and thereby admits a larger amount of external air at 81 which passes by way of connection 82 to secondary pneumatic 77. Air entering this secondary pneumatic by connection 82 lifts diaphragm 83, opens valve 84, and closes valve 85 thereby permitting the air in the bellows 78 to pass by way of connection 86 into the secondary pneumatic and through the valve 84 into the exhausted chamber 75, causing bellows 78 to be collapsed to perform the function ascribed to it.

When the machine is in normal operation and is writing from one or the other of the control sheets, the key hammers are operated by their pneumatics, controlled by the perforations in the active control sheet, and thus operate the keys of the typewriter. The letter space action of the typewriter is effected by the usual drum spring and escapement mechanism without the aid of the pneumatic operator. When however the end of a line is reached, or whenever it is desired to commence a new line, the carriage 187 must be returned against the action of the carriage spring. This operation and the line-spacing operation which ordinarily accompanies it, are accomplished by the pneumatic operator by means which for the most part are the same as disclosed in Patent No. 1,109,597, above referred to.

The carriage is returned by an arm 88 mounted on a frame 89 which also carries a half nut 90 (see Fig. 2) adapted to be swung into engagement with a screw or worm 91 on the shaft 26, which it will be recalled, is continuously revolved by the pinion 25 driven from the vertical shaft 23. The screw or worm 91 extends substantially across the front of the machine and revolves in such a direction as to move the half nut in the direction of the return of the carriage when the two engage. The frame 89 is mounted to swing on a rod 92 as a pivot, and also to move longitudinally on the rod 92. The arm 88 is so shaped as to engage the carriage-return and line-spacing lever or mechanism 188 of the carriage. The normal angular position of the frame 89 on its pivot rod 92 is, as shown in Fig. 2 with the half nut out of engagement with screw 91. This is the angular position of the frame 89 when the carriage is being fed forward; and the carriage by pushing against the arm 88 during such forward feed moves the frame along the rod 92 with it. For holding the frame 89 in any desired angular position on the rod 92 and for swinging it on its pivot, the frame has an arm 93 which carries rollers 94 to engage a rod 95, parallel to the rod 92 and supported on arms 95ᵃ (see Fig. 6) which also swing on the rod 92 as a pivot. The weight of the control sheet driving rolls, and attached parts, normally holds the rod 95 with the frame 89 in Fig. 2 position, by the following means:

The rod 95 is connected by a link 96 with a bell crank 97, pivoted on one of the arms 36 which support the roll 41 and driving gear 37 for the feeding of the control sheet 1. The lower arm of the bell crank 97 is connected by a link 98 with a lever arm 99 pivoted on the arm 48 which carries the roll 52 and driving pinion 50 for the address control sheet 2. The lower arm of bell crank 97 and the arm 99 are both turned or offset at 100 to protrude below their respective supporting arms 36 and 48. The length of the link 96 is so adjusted that when the arms 36 are set in the position shown in Fig. 2, for the feed of the control sheet 1, the offset portion 100 of lever 97 lies immediately under the arm 36, and, by reason of the weight imposed upon the latter, holds link 96 from movement with the frame 89 such as would bring the half nut to the screw 91. At this time the arms 48 at the address control roll are in such position that were it not for the arms 36, the bell crank 97 could be rocked freely by the link 96. When however, the arms 48 are rocked down for the drive of the address control sheet, and the arms 36 are rocked up to silence the control sheet 1, it will then be arm 48 acting through the link 98 which holds the bell crank 97 and link 96 in place. The frame 89 and half nut are therefore seen to be held by the link 96 in the position shown in Fig. 2 during the feed of the carriage, no matter which control sheet is being employed.

In each control sheet, at a position indicating the end of each line of writing, and wherever a new line is required, there are perforations which register with a duct in the tracker board to control a power pneumatic 101 by means of which the frame 89 is swung around its axis 92 to bring the half nut into engagement with the worm 91. At such times the weight on the arm 36 or 48 is not sufficient to prevent the movement of the frame 89 with the link 96 and consequently that weight is lifted, thereby disconnecting whichever control sheet has been in operation, from its driving mechanism. This silencing of the control sheet at the time the carriage is to be returned is natural and proper, as no writing is done during the return of the carriage. The pneumatic 101, which causes the carriage to be returned, and silences the control sheet, operates on the frame 89 through mechanism shown in Figs. 2 and 7; said mechanism consisting of a link 102 connecting the pneumatic to an arm 103 on a shaft 104, an arm 105 integral and forming in effect a bell crank lever with the arm 103, and a slide 106 pivotally attached to the arm 105. The slide 106 is guided on a pin 107. Its under surface is stepped and the steps are connected by an incline 108. While the upper step 109 rests upon the pin 107, the end 110 of the slide 106 is in alinement with the rod 95, so that when the pneumatic 101 is operated, the slide advances on its step 109 until it strikes the rod 95 and moves the same with the frame 89 around the rod 92 sufficiently to bring the half nut into engagement with the worm, and sufficiently to draw the link 96 far enough to disengage the driving pinion from the feed roll of whichever control sheet has been operating. The feed of the control sheet is therefore silenced with the duct of the pneumatic 101 still registering with the perforation which caused the pneumatic to operate. The pneumatic continuing to collapse forces the incline 108 of the slide 106 against the pin 107 thereby causing the end of the slide to be lifted above and out of engagement with the rod 95. The slide advances until its step 111 rests upon the pin 107, and here it remains for the time being because the control sheet is silent and the pneumatic therefore remains collapsed.

When the end 110 of slide 106 is lifted out of engagement with rod 95, the weight of the control sheet feeding mechanism cannot at this time return the frame 89 and attached parts to Fig. 2 position because of a locking device heretofore described in said Patent 1,109,597. The locking device is in the form of a spring bolt 112 which is mounted in the frame and bears against one of the arms 95ª so that when the arm against which it bears is rocked by the slide 106, the bolt springs behind the arm and prevents the return of the frame 89. The end of this bolt is however in the path of the half nut 90 which is now returning the carriage and is advancing toward the bolt. As the return of the carriage is completed, the half nut strikes the bolt, forcing it from behind the arm 95ª and permitting the latter, with the frame 89 and all attached parts, to be swung by the weight of the control sheet driving mechanism around the axis 92 to disengage the half nut from the worm and to permit the feed of the control sheet to be resumed. A spring 113 may be employed to effect or assist the return of these parts. The end 110 of the slide 106 having been previously elevated, the slide does not impede the return swing of the rod 92. As soon as the feed of the control sheet is resumed, the duct of the pneumatic 101 is closed by the control sheet and the slide 106 returns to normal position.

The arm 88 on the frame 89, as heretofore stated, not only returns the carriage but moves the line-spacing lever to line-space the platen 189 of the typewriter. It may be desired to line-space several times without any writing, as for instance between the closing of the body of one letter and the address of the next letter. In such event there will be several consecutive operations of the pneumatic 101 effected by successive perforations in the control sheet. Even though the frame 89 is not moved back by the letter feed of the carriage, it will nevertheless be thrown slightly back by the line-spacing lever spring when the pressure on the spacing lever 188 is relieved by the disconnection of the half nut from the worm, so that even where one line-spacing perforaton immediately follows another, there will be sufficient movement of the arm 88 with the frame 89 on each occasion to effect an operation of the line-spacing lever.

When the address control or master sheet 2 has temporarily completed its work and the body of the letter, which is carried by the control sheet 1, is to be written, a perforation in the address control sheet opens a duct in the tracker board 4 which is connected by a tube 115 with a primary pneumatic 116, to operate a secondary pneumatic 117, and, through the latter to operate a power pneumatic or bellows 118. The bellows 118 is connected to a bell crank lever 119, and the latter is connected to a push bar or slide 120 guided on a pin 121. The slide 120 (see Fig. 4) has two steps 122 and 123. When the step 122 rests on pin 121, the slide is in alinement with a pin 124 on the lever 58 which when rocked disconnects the drive of one control sheet and connects the drive of the other. When the power pneumatic 118 is collapsed by the perforation in the address control sheet, it operates to push forward the bar 120, which, traveling on its step 122, engages the pin 124 on the lever 58 and rocks the latter in such manner as to cause the pin 59 to leave its seat 61 on the high portion of the cam surface 55, and to travel over the lower portion of the cam, permitting the arms 36 to fall with the pinion 37 and the latter to engage the pinion 38 on the feed roll 11 of the control sheet 1 so as to drive the same. Simultaneously the pin 60 at the lower end of the lever 58 moves up the cam surface 56 of the lever 54 and rocks that lever in such manner as to lift the driving pinion 50 out of engagement with the pinion 51 on the feed roll of the address control sheet 2, so that the address control sheet is then silenced. The lever 58 is maintained in this position by the pin 60 in the seat 61 of lever 54. The slide bar 120 however continues to move forward, until the lower step 123 on the same climbs up onto the pin 121, with the end 125 of the bar projecting over the pin 124 of the lever 58, as shown in Fig. 1. In this position the bar 120 and the lever 58 remain during the operation of the control sheet 1.

When the body of the letter has been written from the control sheet 1 so that the machine is ready to write the next address on the address control sheet 2 for the following letter, a perforation in the control sheet 1 opens a duct to a tube 126 leading from the tracker board 3 to the primary pneumatic 76, and in a manner heretofore described in connection with Fig. 8 causes the collapse of the power bellows 78. The power bellows 78 is connected to a bell crank lever 127 and the latter to a slide bar 128 similar to the bar 120. The bar 128 is guided on a pin 129 and in the position shown in Fig. 1 is in alinement with a pin 130 on the lever 58. When the power bellows 78 collapses, the bar 128 moves into engagement with the pin 130 and rocks the lever 58 from the position shown in Fig. 1 to the position shown in Fig. 4, thereby disconnecting the drive of the control sheet 1 and connecting the drive of the address control sheet 2. By reason of the fact that at the time the pneumatic 78 operates, the end of the bar 120 is above the pin 124 on lever 58, the movement of the lever 58, when acted upon by the bar 128, is not obstructed by the bar 120. As soon as the address sheet resumes operation, the perforation in the address control sheet, which originally opened the duct to the bellows 118, passes that duct, and the latter is closed, thereby causing the bellows 118 to expand and the bar 120 to be drawn back to its Fig. 4 position, where it remains until the control sheet 1 is again to be operated. In a like manner the end of the bar 128 is held on pin 129 above the pin 130 on the lever 58 so as not to impede the movement of the lever 58 when the latter is moved by the bar 120. Resumption of the operation of control sheet 1 closes the duct to cause the bellows 78 to expand and return the bar 128 to Fig. 1 position. When the operator leaves the machine, and when for other reasons it is desired to discontinue the operation of the machine, the drive of the exhaust bellows 65—66 may be discontinued. When the exhaust bellows 65—66 are silenced, the vacuum or partial vacuum in the chambers 75 (see Fig. 8) through which the power pneumatics are exhausted is destroyed, and any power pneumatic which at such time is held collapsed by the exhaust bellows, is thereupon permitted to expand.

It has been explained in connection with Fig. 2 that during the carriage return and platen line-spacing operation the slide bar 106 rests with its lower step 111 on the pin 107 so as not to impede the return swing of the rod 95 with frame 80 and attached parts when the half nut strikes the bolt 112 on completion of the return of the carriage. It has been explained that the slide bar 106 is held forward with its end 110 over the rod 95 during the return movement of the carriage by reason of the fact that the control sheet has been silenced by the movement of the link 96, so that the perforation which operated the pneumatic 101 continues to register with the operating duct of the pneumatic 101, and that so long as this perforation registers with the duct of pneumatic 101, the exhaust bellows 65—66 will continue to hold the pneumatic 101 collapsed. If, after the pneumatic 101 has been operated to return the carriage and line-space the platen, and while the slide 106 is held forward with its end over the rod 95, the operation of the machine is at this time discontinued so as to silence the exhaust bellows 65—66, the pneumatic 101 will then expand and draw back the slide 106. When the operator again starts the bellows 65—66, the pneumatic 101 must again collapse, because there has been no movement of the control sheet since that collapse of the pneumatic which preceded the silencing of the bellows 65—66, and the perforation in the control sheet which effected that first collapse continues to register with the duct of the pneumatic 101. The second collapse of the pneumatic 101 upon resumption of the bellows 65—66 causes the slide 106 to move forward again, and, unless provision to the contrary is made, again to strike the rod, thus effecting a second line-spacing movement of the platen. This second line-spacing operation is not desired, and in the present invention is prevented by the following means.

In Fig. 6, there is shown a finger piece 135 mounted on a rock shaft 136 to which is attached a bell crank lever 137. One arm of the bell crank lever 137 carries a pin 138, adapted, when the finger piece 135 is turned clockwise or to the right, to engage and depress a lever arm 139 fast to a rock shaft 140. Also fast to the rock shaft 140 is a lever arm 141 to the end of which is pivotally attached a pull bar or rod 142. The bar 142 is slotted at 143; and, through the slot 143, extends the slide 106, as shown in Figs. 6 and 7. Whenever the operation of the exhaust bellows 65—66 is to be discontinued, the finger piece 135 is first turned to the right so as to cause the lever arm 141 to lift the rod 142 until the lower wall of the slot 143 comes into engagement with the slide 106. This operation of the finger piece 135 and the subsequent silencing of the bellows are usually effected after a line has been written and just after the pneumatic 101 has been operated to return the carriage and to line-space for the next line, but before the control sheet is again placed in operation to commence the next line. The end 110 of the slide 106 therefore still remains above the rod 95, with the lower step 111 of the slide 106 resting upon the pin 107. The finger piece 135 is now turned to the right to raise the bar 142 into contact with the slide 106. The operation of the exhaust bellows may then be discontinued. The pneumatic 101 expanding, upon silencing of the exhaust bellows, causes the slide to be drawn back as heretofore described, but the slide cannot now fall with its step 109 on the pin 107, because it is held elevated by the bar or hanger 142. It therefore assumes the position shown in Fig. 7, in which it is held entirely out of contact with the guide pin 107 and although drawn back, is nevertheless held with its end at a higher elevation than the rod 95. Resumption of operation of the bellows 65 causes the pneumatic 101 to expand, but the slide 106 in coming forward this time cannot strike the rod 95 because of the elevation at which it is held by the hanger 142. No line-spacing movement of the pivoted frame is therefore effected by mere discontinuance and resumption of the bellows 65—66 provided the finger piece 135 is operated as described.

When the operation of the machine is to be discontinued and the finger piece 135 is turned to lift the slide 106 as described, it is also desirable to disconnect the drive from whatever control sheet at that time may be in operation. For this purpose, the lever arm 141 to which is attached the hanger 142, is also attached to a link 144, the distant end of which is attached to the bell crank 97 (see Fig. 2) on the arm 36 which supports the driving pinion 37 of the control sheet 1. The lower arm of the bell crank connects, by means of the link 98, with the lever 99 on the arm 48 which supports the driving pinion 50 of the address control sheet, so that the link 144 is therefore connected to both levers 97 and 99; and, as these levers have offsets 100 for engaging the supporting arms of the driving pinions of the respective control sheets, whenever the link 144 draws on the bell crank 97, it disengages the driving gear from whichever control sheet feed roll has been in operation. When, therefore, the finger piece 135 is turned to the right it not only silences the carriage and line-spacing mechanism but also disconnects the drive of the active control sheet. Operation of a control sheet at this time is therefore impossible.

In order that the bell crank 97 may be rocked by the link 144 without causing the carriage-return mechanism to be operated by the link 96, there is a slot 190 in the bell crank 97 where the latter engages the link 96. By reason of this slot the link 96 remains stationary when the bell crank is rocked by the link 144. A similar slot 191 permits the bell crank 97 to be rocked by the link 96 without movement of the link 144: otherwise the link 144 would operate to render the carriage-return mechanism inoperative at the very time it is desired to operate said mechanism.

It has been stated that the time for operating the finger piece 135 to disconnect the drive of the active control sheet and to render inoperative the carriage-return and line-spacing mechanism, is preferably just after the control sheet has operated the pneumatic 101 to return the carriage. The finger piece 135 may however be operated at any other time so that the bellows can be silenced whenever desired. The finger piece 135 is not however ordinarily operated when a line is unfinished for the reason that at first upon resumption of the bellows 65—66, the exhaust may not be at its highest effectiveness and the printing may be weak and uncertain, thereby spoiling the appearance of the line of writing.

It has been stated that one of the principal reasons for rendering the carriage-return and line-spacing mechanism inoperative before silencing the exhaust bellows, is to prevent a second and undesired spacing operation. There is however another undesirable possibility which is avoided by so rendering the carriage-return and line-spacing mechanism inoperative at this time. Assuming that the finger piece 135 has been operated after the pneumatic 101 has been operated from the control sheet to return the carriage, the carriage nevertheless completes its return movement with the frame 89 and half nut before coming to rest, because the rotation of the worm 91 is not silenced by the finger piece 135. If after this operation, the exhaust bellows 65—66 is silenced and no hanger 142 is present to retain the slide 106 in elevated position, the pneumatic 101, as heretofore stated, on expanding causes the slide 106 to drop behind the bar 95, so that on resumption of the operation of the bellows 65—66 and consequent collapse of the pneumatic 101, the slide 106 again comes forward and strikes the rod 95, moving the latter sufficiently to bring the half nut in engagement with the driving worm 91. The worm immediately carries the half nut again to the bolt 112, causing the swinging frame to be unlocked and to be subjected to the action of the spring 113 and to the draw of the link 96 due to the weight of the driving roll of the contact sheet. It may however be that at this time the exhaust action of the bellows 65—66 has not become sufficiently effective to completely collapse the pneumatic 101, so that the rod 106, instead of traveling far enough forward to bring its lower step 111 onto the pin 107, moves only sufficiently to strike the rod 95 and unlock the frame, and remains with its end in the path of the rod 95. The rod 95 is therefore thrown by spring 113 or link 96, against the end of the slide 106, and may vibrate in such manner as to throw the half nut in and out of the worm, thereby subjecting the apparatus to possible injury. This ineffective part movement of the slide 106 may be a rare occurrence, but is totally avoided where the slide is held elevated by means such as the hanger 142.

The spring 113 has been described as a spring to effect and assist in the return of the swinging carriage return frame. The weight of the driving gear of the control sheet and attached parts is preferably quite sufficient to swing the carriage return frame. It is advisable however to have a slight play in the connection 96 to the bell crank 97. Otherwise the drop of the driving gear into engagement with the feed roll may be restrained in such manner as to prevent instant gripping with the feed rolls, and slip at the gears may result. The arms upon which the driving gear is supported should therefore have a slight movement or play unrestrained by the connection of the link 96 to the carriage return frame. There should however be no loose movement in the operation of the swinging carriage return frame. The slight play in the link 96, in so far as its effect on the carriage return frame may be concerned, is compensated by the action of the spring 113.

The paper to be fed to the typewriter may be held in a magazine 171 and supplied to the typewriter as needed in any suitable manner, as for example by the pneumatically actuated paper feeder 200, shown generally in Fig. 9 and more particularly described in said Patent 1,132,034. It is sufficient to state that the feeder 200, under the control of one of the master sheets, picks up from the magazine 171 a sheet of paper and deposits it into the bight of the platen, to be carried around into the proper position as the previous sheet is removed therefrom.

The invention comprises a power pneumatic 150, by means of which the operation of the machine is stopped when the last sheet of paper in the magazine is reached, and also by means of which the machine is stopped at the last address on the address control sheet. The pneumatic 150 is operated from a secondary pneumatic 151, and the latter from a primary pneumatic 152. The primary pneumatic 152 is connected by a tube 153 to a duct in the address control sheet tracker board 4. A suitable perforation in the address control sheet opens the duct to the tube 153 and operates the pneumatic 150. Similarly the primary pneumatic 152 is connected to a tube 154 which opens at 154ª through the rear wall of the paper magazine 171, and is closed by the papers in the magazine until the last sheet of paper is removed, whereupon the air enters the tube 154 and passes to the primary pneumatic 152, hence operating the power pneumatic 150 to stop the machine. The power pneumatic 150 when collapsed, either from the paper magazine, or from the address control sheet tracker board, effects the stoppage of the machine by the following means: Pneumatic 150 carries on its upper edge a lug or tooth 155 which lies below the arm 139 heretofore described as affixed to the rock shaft 140. Pivotally mounted on the arm 139 is a dog 156 which is adapted to be engaged by the lug 155 on the pneumatic 150 when the latter collapses, so that upon collapse of the pneumatic, the lug 155 is brought into engagement with the tooth of the dog 156; and by drawing on the latter depresses the lever 139, causing the rock shaft 140 to be rocked in such manner as to raise the arm 141, which is also fast to the rock shaft. This movement of the arm 141 as heretofore described draws on the link 144, and so disconnects the drive of whichever control sheet may be in operation, and also by elevating the hanger 142 renders inoperative the carriage return and line spacing mechanism. A spring 157 attached at one end to the lever 139, or to the frame of the machine if desired, and at the other end to the dog 156, tends to swing the tooth of the dog toward the lug 155 on the pneumatic 150. The body of the dog as shown in Fig. 2 bears against the lug 155 in such manner as normally to hold the dog in the position shown in Fig. 2. As soon as the pneumatic collapses, however, the downward movement of the lug 155 with the pneumatic causes the tooth of the dog which continues to bear against the lug, to move inward until the dog is engaged by the lug 155, and by the latter is drawn down to operate the lever 139, and to stop the machine.

It may happen that when the last address on the address control sheet is reached or when the last sheet in the magazine is reached, it is nevertheless desirable to continue the operation of the machine for a moment or so to finish the last sheet, or to complete any matter in the last address. If this is to be done, the pneumatic 150 in collapsing must be prevented from engaging the dog 156 and from thus stopping the machine, or if the pneumatic 150 has already engaged the dog to stop the machine, the dog should be disengaged from the pneumatic to permit the lever 139 to be returned by the weight of the driving rolls to normal position, so that operation of the machine may be resumed even though the pneumatic 150 remains collapsed. In order that the dog may not be engaged by the pneumatic at such time, or to disengage the dog from the pneumatic after operation thereof, there is a pin 158 on the bell crank lever 137 which is carried on the shaft 136 of the finger piece 135. It will be recalled that the finger piece 135 when turned in a clockwise direction (Fig. 6) operates to stop the machine, and to render inoperative the carriage return mechanism. The finger piece 135 when turned in a counter-clockwise direction however rocks the bell crank lever 137 in such manner as to bring the pin 158 into engagement with the upper arm of the dog 156 and to turn the latter on its pivot so as to entirely withdraw the dog 156 from the path of the lug 155 on the pneumatic, or from disengagement with that lug. The collapse of the pneumatic after this operation of the finger piece cannot effect the stopping of the machine, and its continued collapse cannot prevent resumption of operation of the machine after the dog has been disengaged from it.

The pins 138 and 158 on the bell crank lever 157 may engage or enter suitable recesses in the lever arm 139 and in the dog 156 respectively so as to hold these parts in the position to which they may have been turned by the finger piece. The shaft 136 of the finger piece preferably carries an index needle 160 which coöperates with certain markings on the frame of the machine such as "Off," "On," and "Unlock" to indicate the condition of the machine. The index needle 160 when at "On" indicates the normal or operative condition of the machine; when at "Off" indicates the position to which the finger piece is turned to disconnect the drive of the control sheets and to render the carriage return mechanism inoperative; when at "Unlock" indicates that the machine is in condition to operate even though the last sheet in the magazine or the last address on the address roll has been reached.

It has heretofore been mentioned that the address control sheet 2 is paid off of a roll 5, and after passing the tracker board is gathered into a receptacle 6 in the base of the machine. When the last address on the control sheet has reached the tracker board, or whenever it is desired to rewind the address control sheet, this rewinding is in the present machine effected as follows: Mounted on the shaft with roll 5 is a pulley 161 connected by a belt 162 with a pulley 163. The pulley 163 is fast to a shaft 164 which has bearings in a swinging bracket 165. Pivoted at 166 on the frame of the machine is a lever 167 having an operating handle 168. The lower end of the lever 167 is offset at 170 (see Fig. 3) so that when the lever is rocked to the left (see Fig. 1) it engages and swings the bracket 165 in such manner as to bring a friction surface 169 on the pulley 163 into engagement with the belt 71 by means of which the bellows 65 are driven from the power shaft 18. The pulley 163 is therefore turned by the belt 71 and drives the belt 162 in such direction as to rewind the address control sheet on the roll 5.

The apparatus described embodies the invention and its various features. It will of course be understood however that this apparatus may be greatly modified within the scope of the invention, particularly by the substitution of well known mechanical equivalents for the various operating and controlling mechanisms and parts thereof.

Having thus described my invention, I claim:

1. An automatic operator for typewriting machines, comprising type-key actuating means, two master sheets for controlling the operation of the key actuators, a feed roll for each master sheet, a continuously driven driver for each feed roll, a continuous source of power in connection with both of said drivers, and means for bodily shifting said drivers into and out of operative relation to the feed rolls.

2. An automatic operator for typewriting machines, comprising type-key actuating means, a master sheet for controlling the operation of the key actuators, means for feeding the master sheet, a continuously driven driver for said feeding means, a continuous source of power in connection with said driver, and means for bodily shifting said driver into and out of operative relation to the sheet feeding means.

3. An automatic operator for typewriting machines, comprising type-key actuating means, two master sheets for controlling the operation of the key actuators, means for feeding the master sheets, a continuously driven driver for each of said feeding means, a continuous source of power in connection with said drivers, and means for bodily shifting said drivers into and out of operative relation to the sheet feeding means.

4. An automatic operator for typewriting machines, comprising type-key actuating means, two master sheets for controlling the operation of the key actuators, a feed roll for each master sheet, a continuously driven driver for each feed roll, a continuous source of power in connection with both of said drivers, and means for bodily shifting said drivers one at a time into and out of operative relation to the feed rolls.

5. An automatic operator for typewriting machines, comprising type-key actuating means, two master sheets for controlling the operation of the key actuators, a feed roll for each master sheet, a continuously driven driver for each feed roll, a continuous source of power in constant connection with both of said drivers, and means for bodily shifting said drivers alternately into and out of operative relation to the feed rolls.

6. An automatic operator for typewriting machines, comprising type-key actuating means, two master sheets for controlling the operation of the key actuators, a feed roll for each master sheet, a continuously driven driver for each feed roll, a continuous source of power in constant connection with both of said drivers, means for bodily shifting said drivers one at a time into and out of operative relation to the feed rolls, and means for preventing more than one driver at a time being placed in operative relation to its feed roll.

7. An automatic operator for typewriting machines, comprising type-key actuating means, two master sheets for controlling the operation of the key actuators, a feed roll for each master sheet, a continuously driven driver for each feed roll, a continuous source of power in constant connection with both of said drivers, means for bodily shifting said drivers one at a time into and out of operative relation to the feed rolls, and connections to said drivers whereby but one at a time of said drivers may be placed in operative relation to its feed roll.

8. An automatic operator for typewriting machines, comprising type-key actuating means, two master sheets for controlling the operation of the key actuators, a feed roll for each master sheet, a continuously driven driver for each feed roll, a continuous source of power in constant connection with both of said drivers, and means for bodily shifting said drivers one at a time into and out of operative relation to the feed rolls, said drivers being so connected one to the other that but one driver at a time may be placed in operative relation to its feed roll.

9. An automatic operator for typewriting machines, comprising type-key actuating means, two master sheets for controlling the operation of the key actuators, a feed roll for each master sheet, a driver for each feed roll, a continuous source of power in connection with both of said drivers, means for shifting said drivers one at a time into and out of operative relation to the feed rolls, a pivoted member supporting the feed rolls, said drivers being located on opposite sides of the fulcrum of said member, and means for rocking said member to engage one at a time of said drivers with its feed roll.

10. An automatic operator for typewriting machines, comprising type-key actuating means, two master sheets for controlling the operation of the key actuators, a feed roll for each master sheet, a driving roll for each feed roll, a continuous source of power in connection with both of said driving rolls, and means for shifting said driving rolls into and out of engagement with the feed rolls.

11. An automatic operator for typewriting machines, comprising type-key actuating means, a master sheet for controlling the operation of the key actuators, a feed roll for the master sheet, a gear on the feed roll, a continuous source of power, a driving gear in connection with said source of power, and means for shifting said driving gear into and out of engagement with the gear on the feed roll, said feed roll and driving gears having sharp teeth to permit of quick pick-up of the feed roll gear by the driving gear when the two engage.

12. An automatic operator for typewriting machines comprising type-key actuating means, a master sheet for controlling the operation of the key actuators, a feed roll for said master sheet, a driving element for said feed roll mounted to be shifted into and out of engagement with said feed roll, a pivoted bracket on which said driving element is supported, and a gear mounted concentrically with the axis of said pivoted bracket, said gear being in continuous driving connection with said feed roll driving element even though the bracket be shifted to disconnect the driving element from the feed roll.

13. An automatic operator for typewriting machines comprising type-key actuating means, a master sheet for controlling the operation of the key actuators, a feed roll for said master sheet, a driving element for said feed roll mounted to be shifted into and out of engagement with said feed roll, a pivoted bracket on which said driving element is supported, a gear mounted concentrically with the axis of said pivoted bracket, and a gear mounted on said bracket concentric with said feed roll driving element, and in continuous connection with the first-named gear even though the bracket be shifted to disconnect the drive of the feed roll.

14. An automatic operator for typewriting machines comprising type-key actuating means, a master sheet for controlling the operation of the key actuators, a feed roll for said master sheet, a driving element for said feed roll mounted to be shifted into and out of engagement with said feed roll, a pivoted bracket on which said driving element is supported, a gear mounted concentrically with the axis of said pivoted bracket, said gear being in continuous driving connection with said feed roll driving element even though the bracket be shifted to disconnect the driving element from the feed roll, and a cam for rocking the bracket.

15. An automatic operator for typewriting machines comprising type-key actuating means, a master sheet for controlling the operation of the key actuators, a feed roll for said master sheet, a driving element for said feed roll mounted to be shifted into and out of engagement with said feed roll, a pivoted bracket on which said driving element is supported, a gear mounted concentrically with the axis of said pivoted bracket, said gear being in continuous driving connection with said feed roll driving element even though the bracket be shifted to disconnect the driving element from the feed roll, a cam surface on the bracket, and a lever engaging the cam to rock the bracket.

16. An automatic operator for typewriting machines comprising type-key actuating means, a master sheet for controlling the operation of the key actuators, a feed roll for said master sheet, a driving element for said feed roll mounted to be shifted into and out of engagement with said feed roll, a pivoted bracket on which said driving element is supported, a gear mounted concentrically with the axis of said pivoted bracket, said gear being in continuous driving connection with said feed roll driving element even though the bracket be shifted to disconnect the driving element from the feed roll, a cam surface on the bracket, and a lever engaging the cam to rock the bracket, to disengage the driving element from the feed roll, said driving element being moved by gravity into engagement with the feed roll when so permitted.

17. An automatic operator for typewriting machines comprising type-key actuating means, a master sheet for controlling the operation of the key actuators, a feed roll for said master sheet, a driving element for said feed roll mounted to be shifted into and out of engagement with said feed roll, a pivoted bracket on which said driving element is supported, a gear mounted concentrically with the axis of said pivoted bracket, said gear being in continuous driving connection with said feed roll driving element even though the bracket be shifted to disconnect the driving element from the feed roll, a cam surface on the bracket, a lever engaging the cam to rock the bracket, and means on the lever for locking the bracket to hold the driving element out of engagement with the feed roll.

18. An automatic operator for typewriting machines comprising type-key actuating means, a master sheet for controlling the operation of the key actuators, a feed roll for said master sheet, a driving element for said feed roll mounted to be shifted into and out of engagement with said feed roll, a pivoted bracket on which said driving element is supported, and a gear mounted independently of but concentrically with the axis of said pivoted bracket, said gear being in continuous driving connection with said feed roll driving element even though the bracket be shifted to disconnect the driving element from the feed roll.

19. An automatic operator for typewriting machines, comprising type-key actuating means, two master sheets for controlling the operation of the key actuators, a feed roll for each master sheet, a driver for each feed roll, a continuous source of power in connection with both of said drivers, two pivotally mounted brackets, each of which supports one of said drivers, and a lever engaging both of said brackets, said lever being movable with the brackets in two directions, and when moved in either direction, acting to connect up the drive of one master sheet and disconnect the drive of the other master sheet according to which direction the lever is moved.

20. An automatic operator for typewriting machines, comprising type-key actuating means, two master sheets for controlling the operation of the key actuators, a feed roll for each master sheet, a driver for each feed roll, a continuous source of power in connection with both of said drivers, two pivotally mounted brackets, each of which supports one of said drivers, a lever engaging both of said brackets, said lever being movable with the brackets in two directions, and when moved in either direction, acting to connect up the driver of one master sheet and disconnect the drive of the other master sheet according to which direction the lever is moved, and a finger piece connected to the lever whereby the same may be set to effect drive of one or the other master sheets.

21. An automatic operator for typewriting machines, comprising type-key actuating means, two master sheets for controlling the operation of the key actuators, a feed roll for each master sheet, a driver for each feed roll, a continuous source of power in connection with both of said drivers, two pivotally mounted brackets, each of which supports one of said drivers, a lever engaging both of said brackets, said lever being movable with the brackets in two directions, and when moved in either direction, acting to connect up the drive of one master sheet and disconnect the drive of the other master sheet according to which direction the lever is moved, and means controlled from each master sheet to move the lever to silence that sheet and connect up the drive for the other sheet.

22. An automatic operator for typewriting machines, comprising type-key actuating means, two master sheets for controlling the operation of the key actuators, driving connections for effecting the feed of said sheets, and manually controlled means whereby said driving connections may be manually set to effect the drive of either sheet desired.

23. An automatic operator for typewriting machines, comprising type-key actuating means, two master sheets for controlling the operation of the key actuators, driving connections for effecting the feed of said sheets, and manually controlled means whereby said driving connections may be manually set to effect the drive of either sheet desired; each of said sheets having means for automatically switching the drive to the other sheet.

24. An automatic operator for typewriting machines, comprising type key actuating means, a master sheet for controlling the operation of the key actuators, a delivery roll for the master sheet, a source of power, connections therefrom for feeding the sheet from the roll to the key-actuating means, a pulley on said delivery roll, a movable bracket, a pulley carried by said bracket and belted to the pulley on the delivery roll, and means for moving said bracket to connect the pulley thereon to the source of power so that the delivery roll may be rewound.

25. An automatic operator for typewriting machines, comprising type key actuating means, a master sheet for controlling the operation of the key actuators, a delivery roll for the master sheet, a source of power, connections therefrom for feeding the sheet from the roll to the key-actuating means, a pulley on said delivery roll, a pivotally mounted bracket, a pulley carried by said bracket and belted to the pulley on the delivery roll, and a lever for moving said bracket to connect the pulley thereon to the source of power so that the delivery roll may be rewound.

26. In an automatic operator for typewriting machines, the combination of a paper magazine from which paper is fed to the typewriter, a paper feeder for supplying the paper to the typewriter from said magazine, type-key actuating means, a master control device for governing the operation of the key-actuating means, means for operating the control device, and means for automatically discontinuing the operation of the type actuators by the control device when the paper in the magazine is exhausted.

27. In an automatic operator for typewriting machines, the combination of a paper magazine from which paper is fed to the typewriter, a paper feeder for supplying the paper to the typewriter from said magazine, type-key actuating means, master control devices for governing the operation of the key-actuating means, means for operating the control devices, and means for automatically discontinuing the operation of the type actuators by the control devices when the paper in the magazine is exhausted.

28. In an automatic operator for typewriting machines, the combination of a paper magazine from which paper is fed to the typewriter, a paper feeder for supplying the paper to the typewriter from said magazine, type-key actuating means, a master control device for governing the operation of the key-actuating means, means for operating the control device, and pneumatic means for automatically discontinuing the operation of the type actuators by the control device when the paper in the magazine is exhausted.

29. In an automatic operator for typewriting machines, the combination of a paper magazine from which paper is fed to the typewriter, a paper feeder for supplying the paper to the typewriter from said magazine, type-key actuating means, a master control device for governing the operation of the key-actuating means, means for operating the control device, and means controlled by the paper in the magazine and brought in play when the paper in the magazine is exhausted for automatically discontinuing the operation of the type-key actuating means by the control device.

30. In an automatic operator for typewriting machines, the combination of type key actuating means, a control device for governing the writing of the body of the letters including a master letter, an address control device for governing the writing of the addresses to the letters including a series of master addresses, means for operating said control devices, and means controlled by the last master address in the series for automatically discontinuing the operation of said devices at the last address.

31. In an automatic operator for typewriting machines, the combination of type-key actuating means, a tracker board and pneumatic connections from the tracker board to the key actuating means, a master sheet coöperating with said tracker board to control the operation of the key actuators for writing the body of the letters, a second tracker board and pneumatic connections therefrom to the key actuators, an address master sheet coöperating with said second tracker board to govern the writing of the addresses to the letters, and means pneumatically connected to said address tracker board to discontinue all writing at the last address on the address master sheet.

32. In an automatic operator for typewriting machines, the combination of a magazine from which paper is fed to the typewriter, a paper feeder for supplying the paper to the typewriter from said magazine, said magazine having an opening therein adapted to be closed by the paper in the magazine, type-key actuating means, a control device for governing the operation of the key actuating means, and a pneumatic device in communication with the opening in the paper magazine to be operated by air entering said opening when the paper is exhausted, said pneumatic device when operated normally acting to discontinue the operation of the key actuators.

33. In an automatic operator for typewriting machines, the combination of a magazine from which paper is fed to the typewriter, a paper feeder for supplying the paper to the typewriter from said magazine, said magazine having an opening therein adapted to be closed by the paper in the magazine, type-key actuating means, a control device for governing the operation of the key actuating means, and a pneumatic device in communication with the opening in the paper magazine to be operated by air entering said opening when the paper is exhausted, said pneumatic device when operated normally acting to discontinue the operation of the control device.

34. In an automatic operator for typewriting machines, the combination of a magazine from which paper is fed to the typewriter, a paper feeder for supplying the paper to the typewriter from said magazine, said magazine having an opening therein adapted to be closed by the paper in the magazine, type-key actuating means, a control device for governing the operation of the key actuating means, a pneumatic device in communication with the opening in the paper magazine to be operated by air entering said opening when the paper is exhausted, said pneumatic device when operated normally acting to discontinue the operation of the control device, and a connection to said pneumatic device governed by the control device, whereby at a given time the control device may cause the pneumatic device to operate to discontinue the action of the key actuators.

35. In an automatic operator for typewriting machines, the combination of a paper magazine from which paper is fed to the typewriter, a paper feeder for supplying the paper to the typewriter from said magazine, type-key actuating means, a master control device for governing the operation of the key-actuating means, means for operating the control device, means for automatically discontinuing the operation of the type actuators by the control device when the paper in the magazine is exhausted, and means for rendering ineffective said automatic discontinuing device.

36. In an automatic operator for typewriting machines, the combination of a paper magazine from which paper is fed to the typewriter, a paper feeder for supplying the paper to the typewriter from said magazine, type-key actuating means, a master control device for governing the operation of the key-actuating means, means for operating the control device, means for automatically discontinuing the operation of the type actuators by the control device when the paper in the magazine is exhausted, and manually controlled means for rendering ineffective said automatic discontinuing device.

37. In an automatic operator for typewriting machines, the combination of type-key actuating means, a master control device for governing the operation of the key-actuating means, means for operating the control device, means for automatically arresting the operation of the control device to discontinue all writing when a certain point in the writing has been reached, and means settable for rendering ineffective said automatic arresting means.

38. In an automatic operator for typewriting machines, the combination of a paper magazine from which paper is fed to the typewriter, a paper feeder for supplying the paper to the typewriter from said magazine, type-key actuating means, a master control device for governing the operation of the key-actuating means, means for operating the control device, means for automatically discontinuing the operation of the type actuators by the control device when the paper in the magazine is exhausted, and manually controlled means for rendering ineffective said automatic discontinuing device after the latter has operated.

39. In an automatic operator for typewriting machines, the combination of a paper magazine from which paper is fed to the typewriter, a paper feeder for supplying the paper to the typewriter from said magazine, type-key actuating means, a master control device for governing the operation of the key-actuating means, means for operating the control device, means for automatically discontinuing the operation of the type actuators by the control device when the paper in the magazine is exhausted, and manually controlled means for rendering ineffective said automatic discontinuing device before the latter has operated.

40. In an automatic operator for typewriting machines, the combination of a paper magazine from which paper is fed to the typewriter, a paper feeder for supplying the paper to the typewriter from said magazine, type-key actuating means, a master control device for governing the operation of the key-actuating means, means for operating the control device, means for automatically discontinuing the operation of the type actuators by the control device when the paper in the magazine is exhausted, and manually controlled means for rendering ineffective said automatic discontinuing device before and after the latter has operated.

41. In an automatic operator for typewriting machines, the combination of type-key actuating means, a master control device for governing the operation of the key-actuating means, means for operating the control device, means for automatically arresting the operation of the control device to discontinue all writing when a certain point in the writing has been reached, and means for rendering ineffective said automatic arresting means before and after the latter has operated.

42. In an automatic operator for typewriting machines, the combination of type-key actuating means, a tracker board and pneumatic connections from the tracker board to the key actuating means, a master sheet coöperating with said tracker board to control the operation of the key actuators for writing the body of the letters, a second tracker board and pneumatic connection therefrom to the key actuators, an address master sheet coöperating with said second tracker board to govern the writing of the addresses to the letters, means pneumatically connected to said address tracker board to discontinue all writing at the last address on the address master sheet, and manually controlled means for rendering ineffective said last named means.

43. In an automatic operator for typewriting machines, the combination of a magazine from which paper is fed to the typewriter, a paper feeder for supplying the paper to the typewriter from said magazine, said magazine having an opening therein adapted to be closed by the paper in the magazine, type-key actuating means, a control device for governing the operation of the key actuating means, a pneumatic device in communication with the opening in the paper magazine to be operated by air entering said opening when the paper is exhausted, said pneumatic device when operated normally acting to discontinue the operation of the key actuators, and manually controlled means for rendering ineffective said last named pneumatic discontinuing device.

44. In an automatic operator for typewriting machines, the combination of a magazine from which paper is fed to the typewriter, a paper feeder for supplying the paper to the typewriter from said magazine, said magazine having an opening therein adapted to be closed by the paper in the magazine, type-key actuating means, a control device for governing the operation of the key actuating means, a pneumatic device in communication with the opening in the paper magazine to be operated by air entering said opening when the paper is exhausted, said pneumatic device when operated normally acting to discontinue the operation of the key actuators, and manually controlled means for rendering ineffective said last named pneumatic discontinuing device before and after the latter has operated.

45. In an automatic operator for typewriting machines, the combination of a magazine from which paper is fed to the typewriter, a paper feeder for supplying the paper to the typewriter from said magazine, said magazine having an opening therein adapted to be closed by the paper in the magazine, type-key actuating means, a control device for governing the operation of the key actuating means, means for driving said control device, and a pneumatic operated device in communication with the opening in the paper magazine to be operated by air entering said opening when the paper is exhausted, said pneumatic device when operated normally acting to disengage the driving means for the control device to silence the latter.

46. In an automatic operator for typewriting machines, the combination of a magazine from which paper is fed to the typewriter, a paper feeder for supplying the paper to the typewriter from said magazine, said magazine having an opening therein adapted to be closed by the paper in the magazine, type-key actuating means, a control device for governing the operation of the key actuating means, means for driving said control device, a pneumatic operated device in communication with the opening in the paper magazine to be operated by air entering said opening when the paper is exhausted, said pneumatic device when operated normally acting to disengage the driving means for the control device to silence the latter, and means for preventing such disengagement of the driving means by the pneumatic device when the latter operates upon exhaust of the paper in the magazine.

47. In an automatic operator for typewriting machines, the combination of a magazine from which paper is fed to the typewriter, a paper feeder for supplying the paper to the typewriter from said magazine, said magazine having an opening therein adapted to be closed by the paper in the magazine, type-key actuating means, a control device for governing the operation of the key actuating means, means for driving said control device, a pneumatic operated device in communication with the opening in the paper magazine to be operated by air entering said opening when the paper is exhausted, said pneumatic device when operated normally acting to disengage the driving means for the control device to silence the latter, and manually controlled means for reëngaging the driving means with the control device to continue operation of the machine when the paper in the magazine is exhausted.

48. In an automatic operator for typewriting machines, the combination of a magazine from which paper is fed to the typewriter, a paper feeder for supplying the paper to the typewriter from said magazine, said magazine having an opening therein adapted to be closed by the paper in the magazine, type-key actuating means, a control device for governing the operation of the key actuating means, a driver for said control device, a bellows, a connection from the opening in the magazine for controlling the action of the bellows, and a connection from the bellows to the driver of the control device, the bellows being operated upon movement of air in said connection to the magazine when the opening therein is uncovered upon exhaust of the paper, and said bellows when operated normally acting to disconnect the driver from the control device.

49. In an automatic operator for typewriting machines, the combination of a magazine from which paper is fed to the typewriter, a paper feeder for supplying the paper to the typewriter from said magazine, said magazine having an opening therein adapted to be closed by the paper in the magazine, type-key actuating means, a control device for governing the operation of the key actuating means, a driver for said control device, a bellows, a connection from the opening in the magazine for controlling the action of the bellows, and a connection from the bellows to the driver of the control device, the bellows being operated upon movement of air in said connection to the magazine when the opening therein is uncovered upon exhaust of the paper, and said bellows when operated normally acting to disconnect the driver from the control device; said connection from the bellows to the driving mechanism comprising an element which is movable when desired to break said connection and thus render ineffective the action of the bellows on the driving means.

50. In an automatic operator for typewriting machines, the combination of a magazine from which paper is fed to the typewriter, a paper feeder for supplying the paper to the typewriter from said magazine, said magazine having an opening therein adapted to be closed by the paper in the magazine, type-key actuating means, a control device for governing the operation of the key actuating means, a driver for said control device, a bellows, a connection from the opening in the magazine for controlling the action of the bellows, a connection from the bellows to the driver of the control device, the bellows being operated upon movement of air in said connection to the magazine when the opening therein is uncovered upon exhaust of the paper, and said bellows when operated normally acting to disconnect the driver from the control device; said connection from the bellows to the driving mechanism comprising a latch normally disengaged from the bellows but adapted to be engaged by the bellows upon operation of the latter, and means for throwing said latch out of reach of the bellows to render ineffective the action of the bellows on the driving mechanism.

51. In an automatic operator for typewriting machines, the combination of a magazine from which paper is fed to the typewriter, a paper feeder for supplying the paper to the typewriter from said magazine, said magazine having an opening therein adapted to be closed by the paper in the magazine, type-key actuating means, a control device for governing the operation of the key actuating means, a driver for said control device, a bellows, a connection from the opening in the magazine for controlling the action of the bellows, a connection from the bellows to the driver of the control device, the bellows being operated upon movement of air in said connection to the magazine when the opening therein is uncovered upon exhaust of the paper, and said bellows when operated normally acting to disconnect the driver from the control device; said connection from the bellows to the driving mechanism comprising a latch normally disengaged from the bellows but adapted to be engaged by the bellows upon operation of the latter, and means for moving said latch out of engagement with the bellows to unlock the latter from the driving mechanism, and so permit operation of the control device after the magazine is exhausted.

52. In an automatic operator for typewriting machines, the combination of type-key actuating means, a carriage return and line-spacing mechanism, a control device for governing the action of the key actuating means and for governing the carriage return and line-spacing mechanism, and means for rendering the carriage return and line-spacing mechanism inoperable by the control device during the operation of the latter.

53. In an automatic operator for typewriting machines, the combination of type-key actuating means, a carriage return and line-spacing mechanism, a control device for governing the action of the key-actuating means, a connection from the control device for governing the carriage return and line-spacing mechanism, and means for breaking said connection to render the carriage return and line-spacing mechanism inoperable by the control device during the operation of the latter.

54. In an automatic operator for typewriting machines, the combination of type-key actuating means, a carriage return and line-spacing mechanism, a control device for governing the action of the key-actuating means, a connection from the control device for governing the carriage return and line-spacing mechanism, said connection comprising a push bar, and means for forcing said bar against the carriage return mechanism to operate the latter, and means for shifting said push bar to a position where it cannot strike the carriage return mechanism when operated, thus breaking said connection to render the carriage return and line-spacing mechanism inoperable by the control device.

55. In an automatic operator for typewriting machines, the combination of type-key actuating means, a carriage return and line-spacing mechanism, a control device for governing the action of the key-actuating means and for governing the carriage return and line-spacing mechanism, and manually operated means for rendering the carriage return and line-spacing mechanism inoperable by the control device.

56. In an automatic operator for typewriting machines, the combination of type-key actuating means, a control device for governing the action of the key-actuating means, driving mechanism for the control device, and manually operated means for disconnecting the control device from its driving mechanism.

57. In an automatic operator for typewriting machines, the combination of type-key actuating means, a carriage return and linespacing mechanism, a control device for governing the action of the key-actuating means and for governing the carriage return and line-spacing mechanism, driving mechanism for the control device, and means for rendering the carriage return and line-spacing mechanism inoperable by the control device, and for simultaneously disconnecting the control device from its driving mechanism.

58. In an automatic operator for typewriting machines, the combination of type-key actuating means, two control devices for separately and intermittently governing the action of the key-actuating means, driving mechanism for each of the control devices, and manually operated means controlling both of said driving mechanisms to disconnect from its respective control device whichever of said driving mechanisms is connected to its control device, while at the same time holding the other driving mechanism out of connection with its respective control device, so that neither of said control devices can operate.

59. In an automatic operator for typewriting machines, the combination of type-key actuating means, two control devices for separately and intermittently governing the action of the key-actuating means, driving mechanism for each of the control devices, manually operated means controlling both of said driving mechanisms to disconnect from its respective control device whichever of said driving mechanisms is connected to its control device, while at the same time holding the other driving mechanism out of connection with its respective control device, so that neither of said control devices can operate, a carriage return and line-spacing mechanism, and means whereby the same is rendered inoperative when said manually controlled means is operated.

60. In an automatic operator for typewriting machines, the combination of type-key actuating means, two control devices for separately and intermittently governing the action of the key-actuating means, driving mechanism for each of the control devices, movable supports on which said driving mechanisms are mounted to be shifted in and out of driving connection with their respective control devices, means for connecting and shifting said supports, so that when the driving connection of one control device is made, that of the other is broken, and means for engaging both of said supports and for moving the support of the driving mechanism of the active control device while maintaining the other support in such position as to render the driving mechanism thereon out of connection with the inactive control device.

61. In an automatic operator for typewriting machines, the combination of type-key actuating means, two control devices for separately and intermittently governing the action of the key actuating means, driving mechanism for each of the control devices, movable supports on which said driving mechanisms are mounted to be shifted in and out of driving connection with their respective control devices, means for connecting and shifting said supports, so that when the driving connection of one control is made, that of the other is broken, a lever pivotally mounted to rock on each of said supports and having means which, when the lever is rocked, may be brought to bear upon and move the support in one direction, a connection from the lever on one support to the lever on the other support whereby the two levers are caused to move together when either is operated, and means for moving said levers together to cause the lever on the support from which the active control drive is being effected to move that support so as to break the drive therefrom, and to cause the lever on the other support to be moved in such manner as to hold the driving mechanism on that support out of connection with its respective control device.

62. In an automatic operator for typewriting machines, the combination of type-key actuating means, two control devices for separately and intermittently governing the action of the key actuating means, driving mechanism for each of the control devices, movable supports on which said driving mechanisms are mounted to be shifted in and out of driving connection with their respective control devices, said supports being gravity controlled in their movement in one direction, means for connecting and shifting said supports, so that when the driving connection of one control is made, that of the other is broken, a lever pivotally mounted to rock on each of said supports, each lever having an offset below its respective support which, when the lever is rocked, may be brought to bear upon and lift the support in one direction, a connection from the lever on one support to the lever on the other support whereby the two levers are caused to move together when either is operated, and means for moving said levers together to cause the lever on the support from which the active control drive is being effected to lift that support so as to break the drive therefrom, and to cause the lever on the other support to be moved in such manner as to hold the driving mechanism on that support out of connection with its respective control device.

63. In an automatic operator for typewriting machines, the combination of type-key actuating means, two control devices for separately and intermittently governing the action of the key actuating means, driving mechanism for each of the control devices, movable supports on which said driving mechanisms are mounted to be shifted in and out of driving connection with their respective control devices, said supports being gravity controlled in their movement in one direction, means for connecting and shifting said supports, so that when the driving connection of one control is made, that of the other is broken, a lever pivotally mounted to rock on each of said supports, each lever having an offset below its respective support which, when the lever is rocked, may be brought to bear upon and lift the support in one direction, a connection from the lever on one support to the lever on the other support whereby the two levers are caused to move together when either is operated, means for moving said levers together to cause the lever on the support from which the active control drive is being effected to lift that support so as to break the drive therefrom, and to cause the lever on the other support to be moved in such manner as to hold the driving mechanism on that support out of connection with its respective control device, and hand controlled means for operating said levers to maintain both control devices inactive.

64. In an automatic operator for typewriting machines, the combination of type-key actuating means, two control devices for separately and intermittently governing the action of the key-actuating means, driving mechanism for each of the control devices, movable supports on which said driving mechanisms are mounted to be shifted in and out of driving connection with their respective control devices, means for connecting and shifting said supports, so that when the driving connection of one control device is made, that of the other is broken, means for engaging both of said supports and for moving the support of the driving mechanism of the active control device while maintaining the other support in such position as to render the driving mechanism thereon out of connection with the inactive control device, and a carriage return and line-spacing mechanism connected to said last named support engaging means so that the latter is operated when the carriage return and line-spacing mechanism is operated.

65. In an automatic operator for typewriting machines, the combination of type-key actuating means, two control devices for separately and intermittently governing the action of the key actuating means, driving mechanism for each of the control devices, movable supports on which said driving mechanisms are mounted to be shifted in and out of driving connection with their respective control devices, said supports being gravity controlled in their movement in one direction, means for connecting and shifting said supports, so that when the driving connection of one control is made, that of the other is broken, a lever pivotally mounted to rock on each of said supports, each lever having an offset below its respective support which, when the lever is rocked, may be brought to bear upon and lift the support in one direction, a connection from the lever on one support to the lever on the other support whereby the two levers are caused to move together when either is operated, means for moving said levers together to cause the lever on the support from which the active control drive is being effected to lift that support so as to break the drive therefrom, and to cause the lever on the other support to be moved in such manner as to hold the driving mechanism on that support out of connection with its respective control device, and a carriage return and line-spacing mechanism connected to said levers so that the latter are operated when the carriage return and line-spacing mechanism is operated.

66. In an automatic operator for typewriting machines, the combination of type-key actuating means, two control devices for separately and intermittently governing the action of the key actuating means, driving mechanism for each of the control devices, movable supports on which said driving mechanisms are mounted to be shifted in and out of driving connection with their respective control devices, said supports being gravity controlled in their movement in one direction, means for connecting and shifting said supports, so that when the driving connection of one control is made, that of the other is broken, a lever pivotally mounted to rock on each of said supports, each lever having an offset below its respective support which, when the lever is rocked, may be brought to bear upon and lift the support in one direction, a connection from the lever on one support to the lever on the other support whereby the two levers are caused to move together when either is operated, means for moving said levers together to cause the lever on the support from which the active control drive is being effected to lift that support so as to break the drive therefrom, and to cause the lever on the other support to be moved in such manner as to hold the driving mechanism on that support out of connection with its respective control device, a carriage return and line-spacing mechanism connected to said levers so that the latter are operated when the carriage return and line-spacing mechanism is operated, and means for preventing return to normal position of the levers and carriage return and line-spacing mechanism until after the carriage return and line-spacing operation is completed.

67. In an automatic operator for typewriting machines, the combination of type-key actuating means, two control devices for separately and intermittently governing the action of the key-actuating means, driving mechanism for each of the control devices, movable supports on which said driving mechanisms are mounted to be shifted in and out of driving connection with their respective control devices, means for connecting and shifting said supports, so that when the driving connection of one control device is made, that of the other is broken, means for engaging both of said supports and for moving the support of the driving mechanism of the active control device while maintaining the other support in such position as to render the driving mechanism thereon out of connection with the inactive control device, a carriage return and line-spacing mechanism, and means for rendering the same inoperative, said last named means being connected to and operable simultaneously with the last named support engaging and actuating means.

68. In an automatic operator for typewriting machines, the combination of type-key actuating mechanism, a tracker board and control sheet coöperating therewith for governing the operation of the key-actuating mechanism, a driving means for the control sheet, a line-spacing mechanism, a connection from the tracker board to operate the line-spacing mechanism when the sheet presents the proper perforation, a bellows normally held expanded, means for exhausting the bellows when the connection from the tracker board is open, means movable by the collapse of the bellows to engage and operate the line-spacing mechanism and to silence the control device, with the tracker board connection open, said bellows exhausting means being continuously operated but only connected to the bellows when the tracker board connection is open, means for silencing the bellows exhausting means when said tracker board connection is open, thus causing the bellows to expand and effect a return movement of said line-spacing connection, and means for preventing operative engagement of said line-spacing connection with the line-spacing mechanism when the bellows again collapses in resumption of operation of the bellows exhausting means.

69. In an automatic operator for typewriting machines, the combination of type-key actuating means, a tracker board and control sheet coöperating therewith for governing the operation of the key-actuating mechanism, a driving means for the control sheet, a line-spacing mechanism, a connection from the tracker board to operate the line-spacing mechanism when the sheet presents the proper perforation, a bellows normally held expanded, means for exhausting the bellows when the connection from the tracker board is open, means movable by the collapse of the bellows to engage and operate the line-spacing mechanism and to silence the control device, with the tracker board connection open, said bellows exhausting means being continuously operated but only connected to the bellows when the tracker board connection is open, means for silencing the bellows exhausting means when said tracker board connection is open, thus causing the bellows to expand and effect a return movement of said line-spacing connection, said connection comprising a push bar normally in alinement with and adapted to be forced against the line-spacing mechanism upon collapse of the bellows, and means for shifting said push bar out of alinement with the line-spacing mechanism so that when the bellows expands and collapses on silencing and resumption of the bellows exhausting means, it cannot at such times again operate the line-spacing mechanism.

70. The combination with a machine operative to perform certain functions, of pneumatic mechanism for actuating said machine, said pneumatic mechanism including a plurality of controlling sets, each controllable by a separate master sheet, motive means, and driving connections between each of said sets and said motive means, a control for permitting only a single set to be connected in driving relation with said driving means at a time, and a manual control for causing all of said sets to be disconnected at the same time.

71. The combination with a machine operative to perform certain functions, of pneumatic mechanism for actuating said machine, said pneumatic mechanism including a plurality of controlling sets, each controllable by a separate master sheet, motive means, driving connections between each of said sets and said motive means, a control for permitting only a single set to be connected in driving relation with said driving means at a time, and an automatic control controllable from one of said master sheets for causing the disconnection of both of said sets from said motive means at the same time.

72. The combination with a machine operative to perform certain functions, of pneumatic mechanism for actuating said machine, said pneumatic mechanism including a plurality of controlling sets, each controllable by a separate master sheet, motive means, driving connections between each of said sets and said motive means, a control for permitting only a single set to be connected in driving relation with said driving means at a time, and an automatic control controllable from said machine for causing both of said sets to be disconnected from said motive means at the same time.

73. The combination with a machine operative to perform certain functions, of pneumatic mechanism for actuating said machine, said pneumatic mechanism including a plurality of controlling sets, each controllable by a separate master sheet, motive means, driving connections between each of said sets and said motive means, a control for permitting only a single set to be connected in driving relation with the driving means at a time, an automatic control controllable from said machine for causing both of said sets to be disconnected from said motive means at the same time, and a manual control permitting the connection of one of said sets with said motive means after the disconnection thereof by said automatic control.

74. The combination with a machine capable of performing certain functions, of automatic actuating means for said machine, including a plurality of control sets, each controllable by an individual master sheet, motive means, driving connections between each of said sets and said motive means, and a manual control for disconnecting both of said sets from said motive means and maintaining them both disconnected at the same time.

75. The combination with a machine capable of performing certain functions, of automatic actuating means for said machine, including a plurality of control sets, each controllable by an individual master sheet, motive means, driving connections between each of said sets and said motive means, an automatic control for disconnecting both of said sets from said motive means, and a manual control for permitting one of said sets to be connected to said motive means after the disconnection by said automatic control.

76. The combination with a tracker, of a roll for manipulating a master sheet across the face of said tracker, motive means, driving connections between said motive means and said roll, a lever for manipulating said driving connections, a latch connected to said lever, and a pneumatic actuator for engaging said latch to actuate said lever.

77. The combination with a tracker, of a roll for manipulating a master sheet across the face of said tracker, motive means, driving connections between said motive means and said roll, a lever for manipulating said driving connections, a latch connected to said lever, a pneumatic actuator for engaging said latch to actuate said lever, and manual means for disconnecting said latch from said pneumatic actuator.

78. The combination with a tracker, of a roll for manipulating a master sheet across the face of said tracker, motive means, driving connections between said motive means and said roll, a lever for manipulating said driving connections, a latch connected to said lever, a pneumatic actuator for engaging said latch to actuate said lever, and manual means for disconnecting said latch from said pneumatic actuator; said manual means being operable to actuate said lever independently of said pneumatic actuator.

79. The combination with a typewriting mechanism including a carriage, of actuating means for said typewriting mechanism, including a carriage return device, a plurality of control sets controllable by master sheets, motive means, driving connections between said motive means and said sets, driving connections between said motive means and said carriage return, and means for concomitantly controlling the connections of said carriage return and certain of said sets with said motive means.

80. The combination with a typewriting machine, of means for actuating said typewriting machine to repeatedly typewrite a given matter any desired number of times, means for inserting in each repetition a different insert of other matter, and means controlled by the inserting means for discontinuing the actuation of the typewriting machine at the insertion of the last insert.

81. In an automatic actuator, the combination, with automatic mechanism; of a master sheet for controlling said actuating mechanism; a carrying roll for said master sheet; a driver for said carrying roll; means independent of said carrying roll for positively operating said driver; and means for alternatively shifting said driver bodily into and out of driving relation to said carrying roll, thereby to cause said driver to positively drive said carrying roll when shifted into such relation thereto.

82. In an automatic actuator, the combination with actuating mechanism, of a master sheet for controlling said actuating mechanism, a feed roll for said master sheet, a pressure roll for said master sheet, and automatic means for concomitantly controlling the drive of said feed roll and the relative position of said pressure roll with respect to said feed roll.

83. In an automatic actuator, the combination with actuating mechanism, of a master sheet for controlling said mechanism, a normally idle carrying and feeding roll for said master sheet, a continuously driven pressure roll for engaging said master sheet on the opposite side to the side engaged by said carrying and feeding roll, and shifting means to bring about relative movement of approach between said rolls so that said master sheet will be gripped and fed between them.

84. In an automatic actuator, the combination with an actuating mechanism, of a master sheet for controlling said actuating mechanism, a roll for said master sheet, a driver for said roll, a bracket pivoted intermediate its ends for supporting said driver, and shifting means engaging said bracket on the opposite side of its pivot from said driver acting to control the feeding of said master sheet by said roll.

85. In an automatic actuator, the combination with actuating mechanism, of a pair of master sheets for controlling said actuating mechanism, a feeding roll for each of said master sheets, a pair of drivers for said feeding rolls, a bracket for each of said drivers, said brackets being pivoted intermediate their ends, and a shifting lever pivoted intermediate its ends engaging both of said brackets on the far side of the pivots thereof with respect to said drivers.

86. In an automatic actuator, the combination with actuating mechanism, of a master sheet for controlling said actuating mechanism, a roll for said master sheet, a driver for said roll, a bracket pivoted intermediate its ends for supporting said driver, and a lever having a pin engaging said bracket to shift the same, said bracket having a socket to engage said pin so as to enable said lever to temporarily detain said bracket in an adjusted position.

87. The combination with a work member magazine, of a feeder for removing work members from said magazine, a master member controlling the feeding action of said feeder, and automatic means controlled by the work members and operative to stop the movement of said master member when the supply of work members is exhausted from said magazine.

88. The combination with a work member magazine, of a pneumatic feeder for sucking up and removing work members from said magazine, a master member controlling the action of said feeder, and pneumatic means controlled by the work members and operating automatically to stop the movement of said master member when the supply of work members is exhausted from said magazine.

89. In an automatic actuator, the combination with actuating mechanism, of controlling mechanism for said actuating mechanism including a master sheet, driving means for said controlling mechanism, and means controlled by said master sheet at a predetermined point in its movement for automatically disconnecting said controlling mechanism from said driving means so as to stop the action of said actuating mechanism.

90. The combination with a machine capable of performing certain functions, of automatic actuating means for operating said machine including a plurality of control sets, each controllable by an individual master member, an actuator for a certain part of said machine requiring an appreciable period of time to complete its action, and automatic means for stopping all of said control sets during this period of time until the action has been completed.

91. The combination with a typewriter having a traveling carriage, of an automatic operator for said typewriter including actuating means for driving said carriage and also including a plurality of control sets each controllable by individual master members, and an automatic mechanism for stopping all of said control sets while said carriage is being driven by said actuating means.

92. The combination with a typewriter, of automatic mechanism for actuating said typewriter including a plurality of control sets, each controllable by a separate master sheet, motive means, driving connections between each of said sets and said motive means, a control for permitting only a single set to be connected in driven relation with said driving means at any time, and a manual control for disconnecting all of said control sets at the same time.

93. The combination with a typewriter, of automatic mechanism for actuating said typewriter including a plurality of control sets each controllable by a separate master member, a control for permitting only a single set to be operative at a time, and a manual control for inhibiting the action of all of said control sets at the same time.

94. The combination with a typewriter, of an automatic actuator for said typewriter including a plurality of control sets each controllable by a separate master sheet, and a manual control for selectively determining which of said control sets will act.

95. The combination with a typewriter, of an automatic actuator for said typewriter including a plurality of master sheets, a carrying roll for each of said master sheets, a driver for each of said carrying rolls, and manual means for selectively determining the active connection between each of said carrying rolls and its driver.

96. The combination with a typewriter having a line-space mechanism, of an operator for said typewriter including actuating means for said line-space mechanism, and means for rendering said actuating means ineffective when certain parts of said operator cease action.

97. The combination with a typewriter having a line-space mechanism, of an operator for said typewriter including actuating means for said typewriter and said line-space mechanism, controlling mechanism for said actuating means, and means for preventing the operation of said line-space mechanism by said actuating means when said controlling mechanism is incapable of action.

98. The combination with a typewriter, including a traveling carriage, of an operator for said typewriter including actuating means, parts of which drive said carriage, controlling mechanism for said actuating means, means for preventing an action of said controlling mechanism during the travel of said carriage, and means for preventing the starting into action of said actuating means to drive said carriage when said controlling mechanism is incapable of action.

99. In an automatic operator for typewriting machines, the combination of typekey actuating means, a control device for governing the action of the key-actuating means, driving mechanism for the control device, automatically operated means for disconnecting the control device from its driving mechanism, and a manual device controlling said automatic means and also operable to manually disconnect the control device.

100. In an automatic operator for typewriting machines, the combination of typekey actuating means, a control device for governing the action of the key-actuating means, driving mechanism for the control device, an automatic device for disconnecting the control device from the driving mechanism, and manual means operable by one operation to render said automatic device ineffective, and operable by a different operation to disconnect the control device from the driving mechanism.

101. In an automatic operator for typewriting machines, the combination with type-key actuating means and a control device governing the action of the key-actuating means, of means to drive the control device, an automatic device for effecting a discontinuance of the operation of the control device, and a manual device movable into and out of position to render said automatic device inoperative, and also operable to directly effect a discontinuance of the operation of said control device.

102. In an automatic operator for typewriting machines, the combination of key-actuating means, a control device for governing the action of said key-actuating means, means to drive the said control device, a power pneumatic operable automatically to render the control device inactive, and a manual device settable into and out of position to render said power pneumatic ineffective.

103. In an automatic operator for typewriting machines, the combination of key-actuating means, a control device for governing the action of said key-actuating means, means to drive the said control device, a power pneumatic operable automatically to render the control device inactive, and a manual device movable into position to render the power pneumatic ineffective, and also operable when moved to another position to manually effect the discontinuance of the control device.

104. In an automatic operator, the combination of key-actuating means; a control device for governing the operation of the key-actuating means; driving mechanism for said control device, a device operatively associated with the control device to disconnect the latter from the driving mechanism; a power device for automatically actuating said disconnecting device; and a manual device operable selectively to render said power device ineffective to actuate said disconnecting device, or to disconnect said control device from said driving mechanism.

105. In an automatic operator, the combination, with a rod, of a swinging frame embodying upright arms pivoted on said rod in spaced parallel relation to each other, and a rod connecting said arms and disposed parallel with the first-named rod; means for swinging said frame in one direction; a spring connected to return said frame; and a locking member engageable with one of said frame arms when the frame has been so swung, to hold said frame in operated position against the action of said returning spring.

106. In an automatic operator, the combination, with a carriage and a carriage-return mechanism; of a rod; a swinging frame controlling said carriage-return mechanism and embodying upright arms pivoted on said rod in spaced parallel relation to each other, and a rod connecting said arms and disposed parallel with the first-named rod; a pneumatic motor operative to swing said frame in one direction, to throw said carriage-return mechanism into operation; a spring connected to return said frame; and a locking member engageable with one of said frame arms when the frame has been so swung, to hold said frame in operated position against the action of said returning spring.

107. In combination, an actuating mechanism, a sheet holding table having an opening adapted to be covered by a sheet carried thereby, and means pneumatically operable to stop said mechanism upon the removal of the last sheet of a pile from over said opening.

108. In combination, an actuating mechanism, a controlling means for stopping the actuating mechanism, a sheet holding table having a fluid inlet, a suction apparatus in communication with said inlet through said controlling means, said inlet adapted to be closed by sheets placed on the table over the inlet and opened by removal of the last sheet, said controlling means being operated by a change of pressure in the communication between said suction apparatus and inlet upon an opening of said inlet.

LYMAN R. ROBERTS.

Witnesses:
K. FRANKFORT,
C. RIPLEY.